(12) United States Patent
Chen et al.

(10) Patent No.: US 9,591,506 B2
(45) Date of Patent: Mar. 7, 2017

(54) PROCESSING METHOD FOR CHANNEL MEASUREMENT, BASE STATION, AND USER EQUIPMENT

(71) Applicant: Huawei Technologies Co., Ltd., Shenzhen, Guangdong (CN)

(72) Inventors: Xiaobo Chen, Beijing (CN); Qiang Li, Beijing (CN); Xiaoan Fan, Beijing (CN); Weimin Xiao, Rolling Meadows, IL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 250 days.

(21) Appl. No.: 14/630,049

(22) Filed: Feb. 24, 2015

(65) Prior Publication Data

US 2015/0172951 A1 Jun. 18, 2015

Related U.S. Application Data

(63) Continuation of application No. PCT/CN2012/080971, filed on Sep. 4, 2012.

(51) Int. Cl.
*H04W 24/10* (2009.01)

(52) U.S. Cl.
CPC ................... *H04W 24/10* (2013.01)

(58) Field of Classification Search
None
See application file for complete search history.

(56) References Cited

U.S. PATENT DOCUMENTS 9,155,077 B2 * 10/2015 Song ................. H04L 1/00
9,357,405 B2 * 5/2016 Seo .................. H04J 11/0053
9,357,418 B2 * 5/2016 Lee ................... H04W 24/10
9,456,372 B2 * 9/2016 Lee ................... H04L 25/0226
9,497,636 B2 * 11/2016 Koskinen ............ H04W 16/14
2013/0279361 A1 * 10/2013 Seo .................. H04J 11/0053
     370/252
2014/0160967 A1 * 6/2014 Gao .................. H04W 24/10
     370/252
2014/0355468 A1 12/2014 Li et al.

FOREIGN PATENT DOCUMENTS

| CN | 102170657 A | 8/2011 |
| CN | 102281638 A | 12/2011 |
| CN | 102291224 A | 12/2011 |
| CN | 102368697 A | 3/2012 |
| WO | WO 2012/044019 A2 | 4/2012 |

OTHER PUBLICATIONS

"Discussion on MCS mismatch between regular and flexible subframes in multi-cell outdoor Pico scenario", Intel Corporation, 3GPP TSG-RAN WG1 #69, May 21-25, 2012, 5 pages.

* cited by examiner

*Primary Examiner* — Kenny Lin

(57) ABSTRACT

This application provides a processing method for channel measurement, a base station, and a user equipment, where the method includes: receiving an interference report from a user equipment; and determining, according to the interference report, at least two measurement sets for the user equipment, and notifying the at least two measurement sets to the user equipment. In this application, a measurement set is determined according to an interference report reported by a user equipment, so that the determined measurement set is more adaptive to a current interference situation of the user equipment, and then channel quality of a subframe of the user equipment can be measured accurately.

20 Claims, 4 Drawing Sheets

Flexible sub-frames having uplink and downlink interference

PROCESSING METHOD FOR CHANNEL MEASUREMENT, BASE STATION, AND USER EQUIPMENT

CROSS REFERENCE TO RELATED APPLICATIONS

This application is a continuation of International Application No. PCT/CN2012/080971, filed on Sep. 4, 2012, which is hereby incorporated by reference in its entirety.

TECHNICAL FIELD

The present invention relates to the field of communications, and in particular, to a processing method for channel measurement, a base station, and a user equipment.

BACKGROUND

In a third Generation Partnership Project (3rd Generation Partnership Project, 3GPP for short) Long Term Evolution (Long Term Evolution, LTE for short) time division duplex (Time Division Duplex, TDD for short) system, the length of a radio frame is 10 ms, and the radio frame includes 10 subframes. The length of each subframe is 1 ms, and a subframe may be configured, by using a network side device, to transmit downlink data or uplink data. The LTE TDD system supports various different uplink and downlink subframe configurations, as shown in Table 1, where D represents a downlink subframe, S represents a special subframe, and U represents an uplink subframe. At a downlink subframe moment, the network side device may send a downlink data packet to a user equipment (User Equipment, UE for short); and at an uplink subframe moment, the user equipment may send an uplink data packet to the network side device. At a special subframe moment, a network device may send a downlink data packet to the user equipment, but the user equipment cannot send an uplink data packet to the network device; therefore, the special subframe is generally processed as a downlink subframe.

TABLE 1

Subframe Configuration Supported by an LTE TDD System

| Subframe Config-uration | Period for Uplink-downlink Switch Point | Subframe Index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the prior art, when the burstiness of uplink and downlink services is considered and the number of users is small, a subframe configuration needs to be changed rapidly and frequently, so as to better match a current service traffic feature. Each cell may dynamically change its subframe configuration according to a transient service requirement of a user served by the cell, where the subframe configuration may be changed every hundreds of milliseconds, or changed even every ten milliseconds.

Each cell dynamically changes the subframe configuration according to the transient service requirement of the user of the cell, which may cause that subframe configurations used by neighboring cells are different, and may cause interference between uplink and downlink services of the neighboring cells. FIG. 1 is a schematic diagram of interference between uplink and downlink services of neighboring cells in the prior art. As shown in FIG. 1, there are two neighboring cells, namely, a cell 1 and a cell 2, in a certain radio frame, the cell 1 uses a subframe configuration 2, the cell 2 uses a subframe configuration 1, and in this case, in a subframe 3 and a subframe 8, the cell 1 is a downlink subframe while the cell 2 is an uplink subframe, and therefore, uplink and downlink interference exists. Particularly, when a UE2 in the cell 2 is very close a UE1 in the cell 1 and the UE2 sends uplink data to the cell 2, strong interference is caused to receiving, by the UE1, downlink data sent by the cell 1. In this case, when the UE1 receives, in subframes 0, 1, 4, 5, 6 and 9, the downlink data sent by the cell 1, the cell 2 may also cause co-directional interference to data transmission of the cell 1, but the interference is much smaller than interference caused to the downlink data transmission of the cell 1 by uplink data transmission of the cell 2 in the subframes 3 and 8.

In the prior art, when channel quality of a cell is measured, a base station itself determines at least two measurement sets, and notifies the measurement sets to a user equipment for measurement, and by using this method, channel quality on a subframe cannot be measured accurately.

SUMMARY

In view of this, the application provides a processing method for channel measurement, a base station, and a user equipment, so as to solve a problem in the prior art that channel quality of a subframe cannot be measured accurately.

According to a first aspect, a processing method for channel measurement is provided, which includes: receiving an interference report from a user equipment; determining, according to the interference report, at least two measurement sets for the user equipment; and notifying the at least two measurement sets to the user equipment.

In a first possible implementation of the first aspect, the determining, according to the interference report, at least two measurement sets for the user equipment includes: determining, according to the interference report, at least one flexible subframe in subframes corresponding to the interference report; determining the determined at least one flexible subframe as a second measurement set, and determining at least one subframe in all subframes included in one frame other than the subframe in the second measurement set as a first measurement set.

With reference to the first aspect or the first possible implementation of the first aspect, in a second possible implementation, the determined at least one flexible subframe is a flexible subframe having uplink and downlink interference.

With reference to the first aspect, the first possible implementation of the first aspect, or the second possible implementation of the first aspect, in a third possible implementation, the first measurement set includes all downlink subframes included in one frame.

With reference to the first aspect, the first possible implementation of the first aspect, the second possible implementation of the first aspect, or the third possible implementation of the first aspect, in a fourth possible implementation, the determining, according to the interference report, the at least two measurement sets for the user equipment includes one of the following manners:

determining, according to the interference report, all flexible subframes having uplink and downlink interference in the subframes corresponding to the interference report, determining all the flexible subframes having uplink and downlink interference in the subframes corresponding to the interference report as a second measurement set, and determining a remaining subframe available for downlink data transmission in one frame as a first measurement set;

determining, according to the interference report, all flexible subframes having uplink and downlink interference in the subframes corresponding to the interference report, determining each flexible subframe having uplink and downlink interference as one second measurement set, and determining a remaining subframe available for downlink data transmission in one frame as a first measurement set;

determining, according to the interference report, a flexible subframe having an interference level different from that of a downlink subframe in the subframes corresponding to the interference report, determining the flexible subframe having an interference level different from that of a downlink subframe as a second measurement set, and determining a remaining subframe available for downlink data transmission in one frame as a first measurement set;

determining, according to the interference report, a flexible subframe having an interference level different from that of a downlink subframe and a flexible subframe having an interference level the same as that of a downlink subframe in the subframes corresponding to the interference report, determining the flexible subframe having an interference level different from that of a downlink subframe as a second measurement set, determining the flexible subframe having an interference level the same as that of a downlink subframe as one first measurement set, and determining all downlink subframes included in one frame as another first measurement set;

determining, according to the interference report, a flexible subframe having an interference level different from that of a downlink subframe in the subframes corresponding to the interference report, determining each flexible subframe having an interference level different from that of a downlink subframe as one second measurement set, and determining a remaining subframe available for downlink data transmission in one frame as a first measurement set;

determining, according to the interference report, a flexible subframe having an interference level different from that of a downlink subframe in the subframes corresponding to the interference report, determining, according to an interference level, the flexible subframe having an interference level different from that of a downlink subframe as at least one second measurement set, where each second measurement set is corresponding to one interference level, and determining a remaining subframe available for downlink data transmission in one frame as a first measurement set;

determining, according to the interference report, a flexible subframe having an interference level different from that of a downlink subframe and a flexible subframe having an interference level the same as that of a downlink subframe in the subframes corresponding to the interference report, determining each flexible subframe having an interference level different from that of a downlink subframe as one second measurement set, determining the flexible subframe having an interference level the same as that of a downlink subframe as one first measurement set, and determining all downlink subframes included in one frame as another first measurement set; and determining, according to the interference report, a flexible subframe having an interference level different from that of a downlink subframe and a flexible subframe having an interference level the same as that of a downlink subframe in the subframes corresponding to the interference report, determining, according to an interference level, the flexible subframe having an interference level different from that of a downlink subframe as at least one second measurement set, where each second measurement set is corresponding to one interference level, determining the flexible subframe having an interference level the same as that of a downlink subframe as one first measurement set, and determining all downlink subframes included in one frame as another first measurement set.

With reference to the first aspect, the first possible implementation of the first aspect, the second possible implementation of the first aspect, the third possible implementation of the first aspect, or the fourth possible implementation of the first aspect, in a fifth possible implementation, the interference report is generated by the user equipment according to interference measurement performed on a first subframe set.

With reference to the first aspect, the first possible implementation of the first aspect, the second possible implementation of the first aspect, the third possible implementation of the first aspect, the fourth possible implementation of the first aspect, or the fifth possible implementation of the first aspect, in a sixth possible implementation, the first subframe set is one of the following: a universal set formed by all subframes available for downlink data transmission that are included in one frame or a subset of the universal set, where the universal set or the subset of the universal set includes a flexible subframe; a universal set formed by all flexible subframes included in one frame or a subset of the universal set; and a universal set formed by all flexible subframes having uplink and downlink interference that are included in one frame or a subset of the universal set.

With reference to the first aspect, the first possible implementation of the first aspect, the second possible implementation of the first aspect, the third possible implementation of the first aspect, the fourth possible implementation of the first aspect, the fifth possible implementation of the first aspect, or the sixth possible implementation of the first aspect, in a seventh possible implementation, before the receiving an interference report from a user equipment, the method further includes: notifying the first subframe set to the user equipment.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, or the seventh possible implementation of the first aspect, in an eighth possible implementation, the first subframe set is a set determined by the user equipment or is a predetermined set.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, or the eighth possible implementation of the first aspect, in a ninth possible implementation, the interference report includes at least one of the following: indication information of a subframe having an interference level different from that of a downlink subframe, interference signal intensity of each subframe measured by the user equipment, and an interference level of each subframe measured by the user equipment.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, the eighth possible implementation of the first aspect, or the ninth possible implementation of the first aspect, in a tenth possible implementation, before the receiving an interference report from a user equipment, the method further includes: sending trigger information to the user equipment, so as to trigger the user equipment to report the interference report.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, the eighth possible implementation of the first aspect, the ninth possible implementation of the first aspect, or the tenth possible implementation of the first aspect, in an eleventh possible implementation, the method further includes: receiving channel state information that is corresponding to each measurement set in the at least two measurement sets and is reported by the user equipment.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, the eighth possible implementation of the first aspect, the ninth possible implementation of the first aspect, the tenth possible implementation of the first aspect, or the eleventh possible implementation of the first aspect, in a twelfth possible implementation, the method further includes: performing, according to the channel state information, modulation and coding scheme setting and/or power control on subframes in different measurement sets separately.

According to a second aspect, a processing method for channel measurement is provided, which includes: generating an interference report; sending the interference report to a base station, so that the base station determines, according to the interference report, at least two measurement sets for a user equipment; receiving the at least two measurement sets notified by the base station; and measuring channel state information for each of the at least two measurement sets, and reporting, to the base station, the channel state information corresponding to each of the at least two measurement sets.

In a first possible implementation of the second aspect, a second measurement set in the at least two measurement sets includes only a flexible subframe, and a first measurement set in the at least two measurement sets includes at least one subframe in all subframes included in one frame other than the subframe in the second measurement set.

With reference to the second aspect or the first possible implementation of the second aspect, in a second possible implementation, the second measurement set includes only a flexible subframe having uplink and downlink interference.

With reference to the second aspect, the first possible implementation of the second aspect, or the second possible implementation of the second aspect, in a third possible implementation, the first measurement set includes all downlink subframes included in one frame.

With reference to the second aspect, the first possible implementation of the second aspect, the second possible implementation of the second aspect, or the third possible implementation of the second aspect, in a fourth possible implementation, the at least two measurement sets include a first measurement set and a second measurement set, where the first measurement set and the second measurement set are one of the following:

the second measurement set includes only all flexible subframes having uplink and downlink interference in subframes corresponding to the interference report, and the first measurement set includes a remaining subframe available for downlink data transmission in one frame;

each second measurement set includes only one flexible subframe having uplink and downlink interference in subframes corresponding to the interference report, and the first measurement set includes a remaining subframe available for downlink data transmission in one frame;

the second measurement set includes only all flexible subframes having an interference level different from that of a downlink subframe in subframes corresponding to the interference report, and the first measurement set includes a remaining subframe available for downlink data transmission in one frame;

the second measurement set includes only all flexible subframes having an interference level different from that of a downlink subframe in subframes corresponding to the interference report, one first measurement set includes all downlink subframes included in one frame, and another first measurement set includes all flexible subframes having an interference level the same as that of a downlink subframe in the subframes corresponding to the interference report;

each second measurement set includes only one flexible subframe having an interference level different from that of a downlink subframe in subframes corresponding to the interference report, and the first measurement set includes a remaining subframe available for downlink data transmission in one frame;

each second measurement set includes only at least one flexible subframe having an interference level different from that of a downlink subframe in subframes corresponding to the interference report, where the flexible subframe in each second measurement set is corresponding to one interference level, and the first measurement set includes a remaining subframe available for downlink data transmission in one frame;

each second measurement set includes only one flexible subframe having an interference level different from that of a downlink subframe in subframes corresponding to the interference report, one first measurement set includes all downlink subframes included in one frame, and another first measurement set includes all flexible subframes having an interference level the same as that of a downlink subframe in the subframes corresponding to the interference report; and each second measurement set includes only at least one flexible subframe having an interference level different from that of a downlink subframe in subframes corresponding to the interference report, where the flexible subframe in each second measurement set is corresponding to one interference level, one first measurement set includes all downlink subframes included in one frame, and another first measurement set includes all flexible subframes having an interference level the same as that of a downlink subframe in the subframes corresponding to the interference report.

With reference to the second aspect, the first possible implementation of the second aspect, the second possible implementation of the second aspect, the third possible implementation of the second aspect, or the fourth possible implementation of the second aspect, in a fifth possible implementation, the generating an interference report includes: generating the interference report according to interference measurement performed on a first subframe set.

With reference to the second aspect, the first possible implementation of the second aspect, the second possible implementation of the second aspect, the third possible implementation of the second aspect, the fourth possible implementation of the second aspect, or the fifth possible implementation of the second aspect, in a sixth possible implementation, the generating the interference report according to interference measurement performed on a first subframe set includes: determining a flexible subframe according to the interference measurement performed on the first subframe set; and generating the interference report, where the interference report includes information of the flexible subframe.

With reference to the second aspect, the first possible implementation of the second aspect, the second possible implementation of the second aspect, the third possible implementation of the second aspect, the fourth possible implementation of the second aspect, the fifth possible implementation of the second aspect, or the sixth possible implementation of the second aspect, in a seventh possible implementation, the generating the interference report according to interference measurement performed on a first subframe set includes one of the following manners:

determining, according to the interference measurement performed on the first subframe set, a subframe having an interference level different from that of a downlink subframe in subframes corresponding to the first subframe set, and generating the interference report, where the interference report includes indication information of the subframe having an interference level different from that of a downlink subframe;

determining, according to the interference measurement performed on the first subframe set, interference signal intensity of each subframe in the first subframe set, and generating the interference report, where the interference report includes the interference signal intensity of each subframe in the first subframe set; and determining, according to the interference measurement performed on the first subframe set, an interference level of each subframe in the first subframe set, and generating the interference report, where the interference report includes the interference level of each subframe in the first subframe set.

With reference to the second aspect, the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, or the seventh possible implementation of the second aspect, in an eighth possible implementation, the first subframe set is one of the following: a universal set formed by all subframes available for downlink data transmission that are included in one frame or a subset of the universal set, where the universal set or the subset of the universal set includes a flexible subframe; a universal set formed by all flexible subframes included in one frame or a subset of the universal set; and a universal set formed by all flexible subframes having uplink and downlink interference that are included in one frame or a subset of the universal set.

With reference to the second aspect, the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, the seventh possible implementation of the second aspect, or the eighth possible implementation of the second aspect, in a ninth possible implementation, before the generating an interference report, the method further includes one of the following manners: receiving the first subframe set sent by the base station; determining the first subframe set; and obtaining the predetermined first subframe set.

With reference to the second aspect, the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, the seventh possible implementation of the second aspect, the eighth possible implementation of the second aspect, or the ninth possible implementation of the second aspect, in a tenth possible implementation, the method further includes: receiving trigger information sent by the base station, and sending the interference report to the base station with triggering of the trigger information.

According to a third aspect, a base station is provided, which includes: a receiving unit, configured to receive an interference report from a user equipment; a determining unit, configured to determine, according to the interference report, at least two measurement sets for the user equipment; and a notifying unit, configured to notify the at least two measurement sets to the user equipment.

In a first possible implementation of the third aspect, the determining unit is configured to determine, according to the interference report, at least one flexible subframe in subframes corresponding to the interference report, determine the determined at least one flexible subframe as a second measurement set, and determine at least one subframe in all subframes included in one frame other than the subframe in the second measurement set as a first measurement set.

With reference to the third aspect or the first possible implementation of the third aspect, in a second possible implementation, the determined at least one flexible subframe is a flexible subframe having uplink and downlink interference.

With reference to the third aspect, the first possible implementation of the third aspect, or the second possible implementation of the third aspect, in a third possible implementation, the first measurement set includes all downlink subframes included in one frame.

With reference to the third aspect, the first possible implementation of the third aspect, the second possible implementation of the third aspect, or the third possible implementation of the third aspect, in a fourth possible implementation, the determining unit is configured to determine, according to the interference report, the at least two measurement sets for the user equipment in one of the following manners:

determining, according to the interference report, all flexible subframes having uplink and downlink interference in the subframes corresponding to the interference report, determining all the flexible subframes having uplink and downlink interference in the subframes corresponding to the interference report as a second measurement set, and determining a remaining subframe available for downlink data transmission in one frame as a first measurement set;

determining, according to the interference report, all flexible subframes having uplink and downlink interference in the subframes corresponding to the interference report, determining each flexible subframe having uplink and downlink interference as one second measurement set, and determining a remaining subframe available for downlink data transmission in one frame as a first measurement set;

determining, according to the interference report, a flexible subframe having an interference level different from that of a downlink subframe in the subframes corresponding to the interference report, determining the flexible subframe having an interference level different from that of a downlink subframe as a second measurement set, and determining a remaining subframe available for downlink data transmission in one frame as a first measurement set;

determining, according to the interference report, a flexible subframe having an interference level different from that of a downlink subframe and a flexible subframe having an interference level the same as that of a downlink subframe in the subframes corresponding to the interference report, determining the flexible subframe having an interference level different from that of a downlink subframe as a second measurement set, determining the flexible subframe having an interference level the same as that of a downlink subframe as one first measurement set, and determining all downlink subframes included in one frame as another first measurement set;

determining, according to the interference report, a flexible subframe having an interference level different from that of a downlink subframe in the subframes corresponding to the interference report, determining each flexible subframe having an interference level different from that of a downlink subframe as one second measurement set, and determining a remaining subframe available for downlink data transmission in one frame as a first measurement set;

determining, according to the interference report, a flexible subframe having an interference level different from that of a downlink subframe in the subframes corresponding to the interference report, determining, according to an interference level, the flexible subframe having an interference level different from that of a downlink subframe as at least one second measurement set, where each second measurement set is corresponding to one interference level, and determining a remaining subframe available for downlink data transmission in one frame as a first measurement set;

determining, according to the interference report, a flexible subframe having an interference level different from that of a downlink subframe and a flexible subframe having an interference level the same as that of a downlink subframe in the subframes corresponding to the interference report, determining each flexible subframe having an interference level different from that of a downlink subframe as one second measurement set, determining the flexible subframe having an interference level the same as that of a downlink subframe as one first measurement set, and determining all downlink subframes included in one frame as another first measurement set; and determining, according to the interference report, a flexible subframe having an interference level different from that of a downlink subframe and a flexible subframe having an interference level the same as that of a downlink subframe in the subframes corresponding to the interference report, determining, according to an interference level, the flexible subframe having an interference level different from that of a downlink subframe as at least one second measurement set, where each second measurement set is corresponding to one interference level, determining the flexible subframe having an interference level the same as that of a downlink subframe as one first measurement set, and determining all downlink subframes included in one frame as another first measurement set.

With reference to the third aspect, the first possible implementation of the third aspect, the second possible implementation of the third aspect, the third possible implementation of the third aspect, or the fourth possible implementation of the third aspect, in a fifth possible implementation, the interference report is generated by the user equipment according to interference measurement performed on a first subframe set.

With reference to the third aspect, the first possible implementation of the third aspect, the second possible implementation of the third aspect, the third possible implementation of the third aspect, the fourth possible implementation of the third aspect, or the fifth possible implementation of the third aspect, in a sixth possible implementation, the first subframe set is one of the following: a universal set formed by all subframes available for downlink data transmission that are included in one frame or a subset of the universal set, where the universal set or the subset of the universal set includes a flexible subframe; a universal set formed by all flexible subframes included in one frame or a subset of the universal set; and a universal set formed by all flexible subframes having uplink and downlink interference that are included in one frame or a subset of the universal set.

With reference to the third aspect, the first possible implementation of the third aspect, the second possible implementation of the third aspect, the third possible implementation of the third aspect, the fourth possible implementation of the third aspect, the fifth possible implementation of the third aspect, or the sixth possible implementation of the third aspect, in a seventh possible implementation, the notifying unit is further configured to: before the interference report is received from the user equipment, notify the first subframe set to the user equipment.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, or the seventh possible implementation of the third aspect, in an eighth possible implementation, the first subframe set is a set determined by the user equipment or is a predetermined set.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, or the eighth possible implementation of the third aspect, in a ninth possible implementation, the interference report includes at least one of the following: indication information of a subframe having an interference level different from that of a downlink subframe, interference signal intensity of each subframe measured by the user equipment, and an interference level of each subframe measured by the user equipment.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, the eighth possible implementation of the third aspect, or the ninth possible implementation of the third aspect, in a tenth possible implementation, the notifying unit is further configured to: before the interference report is received from the user equipment, send trigger information to the user equipment, so as to trigger the user equipment to report the interference report.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, the eighth possible implementation of the third aspect, the ninth possible implementation of the third aspect, or the tenth possible implementation of the third aspect, in an eleventh possible implementation, the receiving unit is configured to: for each measurement set in the at least two measurement sets, receive channel state information reported by the user equipment.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, the eighth possible implementation of the third aspect, the ninth possible implementation of the third aspect, the tenth possible implementation of the third aspect, or the eleventh possible implementation of the third aspect, in a twelfth possible implementation, the determining unit is further configured to perform, according to the channel state information, modulation and coding scheme setting and/or power control on subframes in different measurement sets separately.

According to a fourth aspect, a user equipment is provided, which includes: a generating unit, configured to generate an interference report; a sending unit, configured to send the interference report to a base station, so that the base station determines, according to the interference report, at least two measurement sets for the user equipment; a receiving unit, configured to receive the at least two measurement sets notified by the base station; and a measuring unit, configured to measure channel state information for each of the at least two measurement sets, where the sending unit is configured to report, to the base station, the channel state information corresponding to each of the at least two measurement sets.

In a first possible implementation of the fourth aspect, a second measurement set in the at least two measurement sets includes only a flexible subframe, and a first measurement set in the at least two measurement sets includes at least one subframe in all subframes included in one frame other than the subframe in the second measurement set.

With reference to the fourth aspect or the first possible implementation of the fourth aspect, in a second possible implementation, the second measurement set includes only a flexible subframe having uplink and downlink interference.

With reference to the fourth aspect, the first possible implementation of the fourth aspect, or the second possible implementation of the fourth aspect, in a third possible implementation, the first measurement set includes all downlink subframes included in one frame.

With reference to the fourth aspect, the first possible implementation of the fourth aspect, the second possible implementation of the fourth aspect, or the third possible implementation of the fourth aspect, in a fourth possible implementation, the at least two measurement sets include a first measurement set and a second measurement set, where the first measurement set and the second measurement set are one of the following:

the second measurement set includes only all flexible subframes having uplink and downlink interference in subframes corresponding to the interference report, and the first measurement set includes a remaining subframe available for downlink data transmission in one frame;

each second measurement set includes only one flexible subframe having uplink and downlink interference in subframes corresponding to the interference report, and the first measurement set includes a remaining subframe available for downlink data transmission in one frame;

the second measurement set includes only all flexible subframes having an interference level different from that of a downlink subframe in subframes corresponding to the interference report, and the first measurement set includes a remaining subframe available for downlink data transmission in one frame;

the second measurement set includes only all flexible subframes having an interference level different from that of a downlink subframe in subframes corresponding to the interference report, one first measurement set includes all downlink subframes included in one frame, and another first measurement set includes all flexible subframes having an interference level the same as that of a downlink subframe in the subframes corresponding to the interference report;

each second measurement set includes only one flexible subframe having an interference level different from that of a downlink subframe in subframes corresponding to the interference report, and the first measurement set includes a remaining subframe available for downlink data transmission in one frame;

each second measurement set includes only at least one flexible subframe having an interference level different from that of a downlink subframe in subframes corresponding to the interference report, where the flexible subframe in each second measurement set is corresponding to one interference level, and the first measurement set includes a remaining subframe available for downlink data transmission in one frame;

each second measurement set includes only one flexible subframe having an interference level different from that of a downlink subframe in subframes corresponding to the interference report, one first measurement set includes all downlink subframes included in one frame, and another first measurement set includes all flexible subframes having an interference level the same as that of a downlink subframe in the subframes corresponding to the interference report; and each second measurement set includes only at least one flexible subframe having an interference level different from that of a downlink subframe in subframes corresponding to the interference report, where the flexible subframe in each second measurement set is corresponding to one interference level, one first measurement set includes all downlink subframes included in one frame, and another first measurement set includes all flexible subframes having an interference level the same as that of a downlink subframe in the subframes corresponding to the interference report.

With reference to the fourth aspect, the first possible implementation of the fourth aspect, the second possible implementation of the fourth aspect, the third possible implementation of the fourth aspect, or the fourth possible implementation of the fourth aspect, in a fifth possible implementation, the generating unit is configured to generate the interference report according to interference measurement performed on a first subframe set.

With reference to the fourth aspect, the first possible implementation of the fourth aspect, the second possible implementation of the fourth aspect, the third possible implementation of the fourth aspect, the fourth possible implementation of the fourth aspect, or the fifth possible implementation of the fourth aspect, in a sixth possible implementation, the generating unit is configured to determine a flexible subframe according to the interference measurement performed on the first subframe set; and generate the interference report, where the interference report includes information of the flexible subframe.

With reference to the fourth aspect, the first possible implementation of the fourth aspect, the second possible implementation of the fourth aspect, the third possible implementation of the fourth aspect, the fourth possible implementation of the fourth aspect, the fifth possible implementation of the fourth aspect, or the sixth possible implementation of the fourth aspect, in a seventh possible implementation, the generating unit is configured to generate, according to the interference measurement performed on the first subframe set, the interference report in one of the following manners:

determining, according to the interference measurement performed on the first subframe set, a subframe having an interference level different from that of a downlink subframe in subframes corresponding to the first subframe set, and generating the interference report, where the interference report includes indication information of the subframe having an interference level different from that of a downlink subframe;

determining, according to the interference measurement performed on the first subframe set, interference signal intensity of each subframe in the first subframe set, and generating the interference report, where the interference report includes the interference signal intensity of each subframe in the first subframe set; and determining, according to the interference measurement performed on the first subframe set, an interference level of each subframe in the first subframe set, and generating the interference report, where the interference report includes the interference level of each subframe in the first subframe set.

With reference to the fourth aspect, the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, or the seventh possible implementation of the fourth aspect, in an eighth possible implementation, the first subframe set is one of the following: a universal set formed by all subframes available for downlink data transmission that are included in one frame or a subset of the universal set, where the universal set or the subset of the universal set includes a flexible subframe; a universal set formed by all flexible subframes included in one frame or a subset of the universal set; and a universal set formed by all flexible subframes having uplink and downlink interference that are included in one frame or a subset of the universal set.

With reference to the fourth aspect, the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, the seventh possible implementation of the fourth aspect, or the eighth possible implementation of the fourth aspect, in a ninth possible implementation, the receiving unit is further configured to receive the first subframe set sent by the base station; and the user equipment further includes a determining unit, configured to determine the first subframe set; or, the user equipment further includes an obtaining unit, configured to obtain the predetermined first subframe set.

With reference to the fourth aspect, the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, the seventh possible implementation of the fourth aspect, the eighth possible implementation of the fourth aspect, or the ninth possible implementation of the fourth aspect, in a tenth possible implementation, the receiving unit is further configured to receive trigger information sent by the base station, and the sending unit is further configured to send the interference report to the base station with triggering of the trigger information.

According to a fifth aspect, a base station is provided, which includes: a receiver, configured to receive an interference report from a user equipment; and a processor, configured to determine, according to the interference report, at least two measurement sets for the user equipment, and notify the at least two measurement sets to the user equipment.

In a first possible implementation of the fifth aspect, the processor is configured to determine, according to the interference report, the at least two measurement sets for the user equipment in the following manner: determining, according to the interference report, at least one flexible subframe in subframes corresponding to the interference report, determining the determined at least one flexible subframe as a second measurement set, and determining at least one subframe in all subframes included in one frame other than the subframe in the second measurement set as a first measurement set.

With reference to the fifth aspect or the first possible implementation of the fifth aspect, in a second possible implementation, the determined at least one flexible subframe is a flexible subframe having uplink and downlink interference.

With reference to the fifth aspect, the first possible implementation of the fifth aspect, or the second possible implementation of the fifth aspect, in a third possible implementation, the first measurement set includes all downlink subframes included in one frame.

With reference to the fifth aspect, the first possible implementation of the fifth aspect, the second possible implementation of the fifth aspect, or the third possible implementation of the fifth aspect, in a fourth possible implementation, the processor is configured to determine, according to the interference report, the at least two measurement sets for the user equipment in one of the following manners:

determining, according to the interference report, all flexible subframes having uplink and downlink interference in the subframes corresponding to the interference report, determining all the flexible subframes having uplink and downlink interference in the subframes corresponding to the interference report as a second measurement set, and determining a remaining subframe available for downlink data transmission in one frame as a first measurement set;

determining, according to the interference report, all flexible subframes having uplink and downlink interference in the subframes corresponding to the interference report, determining each flexible subframe having uplink and downlink interference as one second measurement set, and determining a remaining subframe available for downlink data transmission in one frame as a first measurement set;

determining, according to the interference report, a flexible subframe having an interference level different from that of a downlink subframe in the subframes corresponding to the interference report, determining the flexible subframe having an interference level different from that of a downlink subframe as a second measurement set, and determining a remaining subframe available for downlink data transmission in one frame as a first measurement set;

determining, according to the interference report, a flexible subframe having an interference level different from that of a downlink subframe and a flexible subframe having an interference level the same as that of a downlink subframe in the subframes corresponding to the interference report, determining the flexible subframe having an interference level different from that of a downlink subframe as a second measurement set, determining the flexible subframe having an interference level the same as that of a downlink subframe as one first measurement set, and determining all downlink subframes included in one frame as another first measurement set;

determining, according to the interference report, a flexible subframe having an interference level different from that of a downlink subframe in the subframes corresponding to the interference report, determining each flexible subframe having an interference level different from that of a downlink subframe as one second measurement set, and determining a remaining subframe available for downlink data transmission in one frame as a first measurement set;

determining, according to the interference report, a flexible subframe having an interference level different from that of a downlink subframe in the subframes corresponding to the interference report, determining, according to an interference level, the flexible subframe having an interference level different from that of a downlink subframe as at least one second measurement set, where each second measurement set is corresponding to one interference level, and determining a remaining subframe available for downlink data transmission in one frame as a first measurement set;

determining, according to the interference report, a flexible subframe having an interference level different from that of a downlink subframe and a flexible subframe having an interference level the same as that of a downlink subframe in the subframes corresponding to the interference report, determining each flexible subframe having an interference level different from that of a downlink subframe as one second measurement set, determining the flexible subframe having an interference level the same as that of a downlink subframe as one first measurement set, and determining all downlink subframes included in one frame as another first measurement set; and determining, according to the interference report, a flexible subframe having an interference level different from that of a downlink subframe and a flexible subframe having an interference level the same as that of a downlink subframe in the subframes corresponding to the interference report, determining, according to an interference level, the flexible subframe having an interference level different from that of a downlink subframe as at least one second measurement set, where each second measurement set is corresponding to one interference level, determining the flexible subframe having an interference level the same as that of a downlink subframe as one first measurement set, and determining all downlink subframes included in one frame as another first measurement set.

With reference to the fifth aspect, the first possible implementation of the fifth aspect, the second possible implementation of the fifth aspect, the third possible implementation of the fifth aspect, or the fourth possible implementation of the fifth aspect, in a fifth possible implementation, the interference report is generated by the user equipment according to interference measurement performed on a first subframe set.

With reference to the fifth aspect, the first possible implementation of the fifth aspect, the second possible implementation of the fifth aspect, the third possible implementation of the fifth aspect, the fourth possible implementation of the fifth aspect, or the fifth possible implementation of the fifth aspect, in a sixth possible implementation, the first subframe set is one of the following: a universal set formed by all subframes available for downlink data transmission that are included in one frame or a subset of the universal set, where the universal set or the subset of the universal set includes a flexible subframe; a universal set formed by all flexible subframes included in one frame or a subset of the universal set; and a universal set formed by all flexible subframes having uplink and downlink interference that are included in one frame or a subset of the universal set.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, or the sixth possible implementation of the fifth aspect, in a seventh possible implementation, the base station further includes: a transmitter, configured to: before the interference report is received from the user equipment, notify the first subframe set to the user equipment.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, or the seventh possible implementation of the fifth aspect, in an eighth possible implementation, the first subframe set is a set determined by the user equipment or is a predetermined set.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, the seventh possible implementation of the fifth aspect, or the eighth possible implementation of the fifth aspect, in a ninth possible implementation, the interference report includes at least one of the following: indication information of a subframe having an interference level different from that of a downlink subframe, interference signal intensity of each subframe measured by the user equipment, and an interference level of each subframe measured by the user equipment.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, the seventh possible implementation of the fifth aspect, the eighth possible implementation of the fifth aspect, or the ninth possible implementation of the fifth aspect, in a tenth possible implementation, the base station further includes the transmitter, configured to: before the interference report is received from the user equipment, send trigger information to the user equipment, so as to trigger the user equipment to report the interference report.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, the seventh possible implementation of the fifth aspect, the eighth possible implementation of the fifth aspect, the ninth possible implementation of the fifth aspect, or the tenth possible implementation of the fifth aspect, in an eleventh possible implementation, the receiver is configured to: for each measurement set in the at least two measurement sets, receive channel state information reported by the user equipment.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, the seventh possible implementation of the fifth aspect, the eighth possible implementation of the fifth aspect, the ninth possible implementation of the fifth aspect, the tenth possible implementation of the fifth aspect, or the eleventh possible implementation of the fifth aspect, in a twelfth possible implementation, the processor is configured to perform, according to the channel state information, modulation and coding scheme setting and/or power control on subframes in different measurement sets separately.

According to a sixth aspect, a user equipment is provided, which includes: a processor, configured to generate an interference report; a transmitter, configured to send the interference report to a base station, so that the base station determines, according to the interference report, at least two measurement sets for the user equipment; and a receiver, configured to receive the at least two measurement sets notified by the base station, where the processor is further configured to measure channel state information for each of the at least two measurement sets; and the transmitter is further configured to report, to the base station, the channel state information corresponding to each of the at least two measurement sets.

In a first possible implementation of the sixth aspect, a second measurement set in the at least two measurement sets includes only a flexible subframe, and a first measurement set in the at least two measurement sets includes at least one subframe in all subframes included in one frame other than the subframe in the second measurement set.

With reference to the sixth aspect or the first possible implementation of the sixth aspect, in a second possible implementation, the second measurement set includes only a flexible subframe having uplink and downlink interference.

With reference to the sixth aspect, the first possible implementation of the sixth aspect, or the second possible implementation of the sixth aspect, in a third possible implementation, the first measurement set includes all downlink subframes included in one frame.

With reference to the sixth aspect, the first possible implementation of the sixth aspect, the second possible implementation of the sixth aspect, or the third possible implementation of the sixth aspect, in a fourth possible implementation, the at least two measurement sets include a first measurement set and a second measurement set, where the first measurement set and the second measurement set are one of the following:

the second measurement set includes only all flexible subframes having uplink and downlink interference in subframes corresponding to the interference report, and the first measurement set includes a remaining subframe available for downlink data transmission in one frame;

each second measurement set includes only one flexible subframe having uplink and downlink interference in subframes corresponding to the interference report, and the first measurement set includes a remaining subframe available for downlink data transmission in one frame;

the second measurement set includes only all flexible subframes having an interference level different from that of a downlink subframe in subframes corresponding to the interference report, and the first measurement set includes a remaining subframe available for downlink data transmission in one frame;

the second measurement set includes only all flexible subframes having an interference level different from that of a downlink subframe in subframes corresponding to the interference report, one first measurement set includes all downlink subframes included in one frame, and another first measurement set includes all flexible subframes having an interference level the same as that of a downlink subframe in the subframes corresponding to the interference report;

each second measurement set includes only one flexible subframe having an interference level different from that of a downlink subframe in subframes corresponding to the interference report, and the first measurement set includes a remaining subframe available for downlink data transmission in one frame;

each second measurement set includes only at least one flexible subframe having an interference level different from that of a downlink subframe in subframes corresponding to the interference report, where the flexible subframe in each second measurement set is corresponding to one interference level, and the first measurement set includes a remaining subframe available for downlink data transmission in one frame;

each second measurement set includes only one flexible subframe having an interference level different from that of a downlink subframe in subframes corresponding to the interference report, one first measurement set includes all downlink subframes included in one frame, and another first measurement set includes all flexible subframes having an interference level the same as that of a downlink subframe in the subframes corresponding to the interference report; and each second measurement set includes only at least one flexible subframe having an interference level different from that of a downlink subframe in subframes corresponding to the interference report, where the flexible subframe in each second measurement set is corresponding to one interference level, one first measurement set includes all downlink subframes included in one frame, and another first measurement set includes all flexible subframes having an interference level the same as that of a downlink subframe in the subframes corresponding to the interference report.

With reference to the sixth aspect, the first possible implementation of the sixth aspect, the second possible implementation of the sixth aspect, the third possible implementation of the sixth aspect, or the fourth possible implementation of the sixth aspect, in a fifth possible implementation, the processor is configured to generate the interference report in the following manner: generating the interference report according to interference measurement performed on a first subframe set.

With reference to the sixth aspect, the first possible implementation of the sixth aspect, the second possible implementation of the sixth aspect, the third possible implementation of the sixth aspect, the fourth possible implementation of the sixth aspect, or the fifth possible implementation of the sixth aspect, in a sixth possible implementation, the processor is configured to generate, according to the interference measurement performed on the first subframe set, the interference report in the following manner: determining a flexible subframe according to the interference measurement performed on the first subframe set; and generating the interference report, where the interference report includes information of the flexible subframe.

With reference to the sixth aspect, the first possible implementation of the sixth aspect, the second possible implementation of the sixth aspect, the third possible implementation of the sixth aspect, the fourth possible implementation of the sixth aspect, the fifth possible implementation of the sixth aspect, or the sixth possible implementation of the sixth aspect, in a seventh possible implementation, the processor is configured to generate, according to the interference measurement performed on the first subframe set, the interference report in one of the following manners: determining, according to the interference measurement performed on the first subframe set, a subframe having an interference level different from that of a downlink subframe in subframes corresponding to the first subframe set, and generating the interference report, where the interference report includes indication information of the subframe having an interference level different from that of a downlink subframe; determining, according to the interference measurement performed on the first subframe set, interference signal intensity of each subframe in the first subframe set, and generating the interference report, where the interference report includes the interference signal intensity of each subframe in the first subframe set; and determining, according to the interference measurement performed on the first subframe set, an interference level of each subframe in the first subframe set, and generating the interference report, where the interference report includes the interference level of each subframe in the first subframe set.

With reference to the sixth aspect, the first possible implementation of the sixth aspect, the second possible implementation of the sixth aspect, the third possible implementation of the sixth aspect, the fourth possible implementation of the sixth aspect, the fifth possible implementation of the sixth aspect, the sixth possible implementation of the sixth aspect, or the seventh possible implementation of the sixth aspect, in an eighth possible implementation, the first subframe set is one of the following: a universal set formed by all subframes available for downlink data transmission that are included in one frame or a subset of the universal set, where the universal set or the subset of the universal set includes a flexible subframe; a universal set formed by all flexible subframes included in one frame or a subset of the universal set; and a universal set formed by all flexible subframes having uplink and downlink interference that are included in one frame or a subset of the universal set.

With reference to the sixth aspect, the first possible implementation of the sixth aspect, the second possible implementation of the sixth aspect, the third possible implementation of the sixth aspect, the fourth possible implementation of the sixth aspect, the fifth possible implementation of the sixth aspect, the sixth possible implementation of the sixth aspect, the seventh possible implementation of the sixth aspect, or the eighth possible implementation of the sixth aspect, in a ninth possible implementation, the receiver is further configured to receive the first subframe set sent by the base station; and the processor is further configured to determine the first subframe set; or, the processor is further configured to obtain the predetermined first subframe set.

With reference to the sixth aspect, the first possible implementation of the sixth aspect, the second possible implementation of the sixth aspect, the third possible implementation of the sixth aspect, the fourth possible implementation of the sixth aspect, the fifth possible implementation of the sixth aspect, the sixth possible implementation of the sixth aspect, the seventh possible implementation of the sixth aspect, the eighth possible implementation of the sixth aspect, or the ninth possible implementation of the sixth aspect, in a tenth possible implementation, the receiver is further configured to receive trigger information sent by the base station, and the transmitter is further configured to send the interference report to the base station with triggering of the trigger information.

According to the foregoing solutions, a measurement set is determined according to an interference report reported by a user equipment, so that the determined measurement set can be adaptive to interference to which the user equipment is subject, and therefore, the user equipment can perform channel measurement and reporting on a subframe in the interference measurement set, so that channel quality of the subframe can be measured accurately.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In this application, a subframe that can be used for downlink data transmission but cannot be used for uplink data transmission is referred to as a downlink subframe, a subframe that can be used for uplink data transmission and also can be used for downlink data transmission is referred to as a flexible subframe, where the flexible subframe can be used for downlink data transmission and uplink data transmission for different cells at the same moment, and can also be used for downlink data transmission and uplink data transmission for the same cell at different moments. In this application, a downlink subframe may be a downlink subframe shown in Table 1, or may be a special subframe shown in Table 1.

An embodiment of the present invention provides a processing method for channel measurement, the method can be implemented at a base station side, and the base station involved in this application may be an evolved node B (Evolved Node B, eNB for short), an access point, a relay station, and another device that can be used for access.

Figure 2:
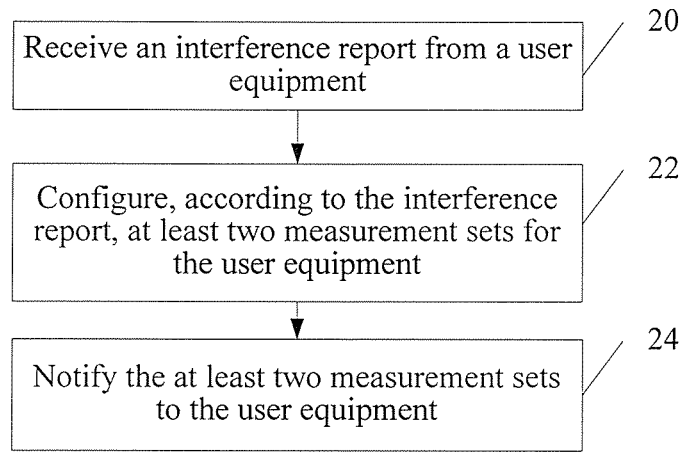
FIG. 2 is a flow chart of a processing method for channel measurement according to a first embodiment of the present invention.

FIG. 2 is a flow chart of a processing method for channel measurement according to a first embodiment of the present invention, and as shown in FIG. 2, the method includes the following steps:

Step 20: Receive an interference report from a user equipment.

Step 22: Determine, according to the interference report, at least two measurement sets for the user equipment.

Step 24: Notify the at least two measurement sets to the user equipment.

In the prior art, after each cell dynamically changes a subframe configuration according to a transient service requirement of its user, a cell may not know a subframe configuration used by a neighboring cell, so that the cell cannot determine which subframe is subject to strong interference, and in this case, a measurement set determined by a base station itself may not include a subframe having strong interference, and the base station may configure a subframe subject to strong interference (for example, a flexible subframe) and a subframe not having strong interference (for example, a downlink subframe) into the same measurement set, so that channel state information obtained through measurement cannot really reflect channel quality of the subframe subject to strong interference. In this embodiment, the base station can learn, according to the interference report reported by the user equipment, which subframe have strong interference, and determine, according to the interference report, a measurement set suitable for measuring the user equipment, and the user equipment separately performs channel state information measurement and reporting on subframes belonging to different measurement sets, so that channel quality of a subframe of the user equipment can be measured accurately.

Preferably, one measurement set in the at least two measurement sets includes only a flexible subframe.

In this embodiment, the base station determines the at least two measurement sets for the user equipment, where one measurement set includes only a flexible subframe, and the user equipment performs channel state information measurement and reporting according to the two measurement sets, so that channel quality of a subframe having strong interference can be measured accurately.

In this embodiment, according to the interference report reported by the user equipment, the base station can determine a measurement set for the user equipment more accurately, so that one measurement set includes only a flexible subframe, the user equipment separately performs channel state information measurement and reporting on subframes belonging to different measurement sets, and channel quality of a subframe having strong interference can be measured accurately.

Preferably, one measurement set in the at least two measurement sets includes only a flexible subframe, and another one or more measurement sets include at least all downlink subframes. For example, a first measurement set and a second measurement set are determined for the user equipment according to the interference report, and the first measurement set and the second measurement set are notified to the user equipment, where the first measurement set includes at least all downlink subframes, and the second measurement set includes only a flexible subframe. The first measurement set and the second measurement set may both be one or more measurement sets, and when multiple first measurement sets exist, each first measurement set may include one or more downlink subframes, and all sets of the first measurement sets include all downlink subframes.

In the prior art, the base station may determine a subframe having strong interference and a subframe not having strong interference into the same measurement set, so that channel quality obtained through measurement cannot accurately reflect channel quality of the subframe not having strong interference, thereby affecting data transmission efficiency in the subframe not having strong interference (for example, when scheduling is performed according to channel state information fed back by a user equipment, the data transmission efficiency in the subframe not having the strong interference is reduced significantly). In this embodiment, according to the interference report reported by the user equipment, the base station may determine a measurement set more accurately, so that the subframe having strong interference and the subframe not having strong interference are determined in different measurement sets, the user equipment separately performs channel state information measurement and reporting on subframes belonging to different measurement sets, and therefore, an effect of the strong interference subframe on the subframe not having the strong interference, especially on the downlink subframe, can be reduced.

Preferably, the determining, according to the interference report, at least two measurement sets for the user equipment may be implemented in the following manner: determining, according to the interference report, at least one flexible subframe in subframes corresponding to the interference report; determining the determined at least one flexible subframe as a second measurement set, and determining at least one subframe in all subframes included in one frame other than the subframe in the second measurement set as a first measurement set. The determined at least one flexible subframe may be a flexible subframe having uplink and downlink interference. A subframe having an interference level or interference intensity different from that of a downlink subframe may be considered as a flexible subframe having uplink and downlink interference. In this embodiment, a measurement set including a flexible subframe having uplink and downlink interference exists, so that channel quality of the flexible subframe having uplink and downlink interference can be measured accurately.

In a preferred implementation of the embodiment of the present invention, the determining, according to the interference report, at least two measurement sets for the user equipment may use one of the following manners:

determining, according to the interference report, all flexible subframes having uplink and downlink interference in the subframes corresponding to the interference report, determining all the flexible subframes having uplink and downlink interference in the subframes corresponding to the interference report as a second measurement set, and determining a remaining subframe available for downlink data transmission in one frame as a first measurement set, where the remaining subframe available for downlink data transmission may include only a downlink subframe, or may include both a downlink subframe and a flexible subframe having an interference level the same as that of the downlink subframe;

determining, according to the interference report, all flexible subframes having uplink and downlink interference in the subframes corresponding to the interference report, determining each flexible subframe having uplink and downlink interference as one second measurement set, and determining a remaining subframe available for downlink data transmission in one frame as a first measurement set, where the remaining subframe available for downlink data transmission may include only a downlink subframe, or may include both a downlink subframe and a flexible subframe having an interference level the same as that of the downlink subframe;

determining, according to the interference report, a flexible subframe having an interference level different from that of a downlink subframe in the subframes corresponding to the interference report, determining the flexible subframe having an interference level different from that of a downlink subframe as a second measurement set, and determining a remaining subframe available for downlink data transmission in one frame as a first measurement set, where the remaining subframe available for downlink data transmission may include only a downlink subframe, or may include both a downlink subframe and a flexible subframe having an interference level the same as that of the downlink subframe;

determining, according to the interference report, a flexible subframe having an interference level different from that of a downlink subframe and a flexible subframe having an interference level the same as that of a downlink subframe in the subframes corresponding to the interference report, determining the flexible subframe having an interference level different from that of a downlink subframe as a second measurement set, determining the flexible subframe having an interference level the same as that of a downlink subframe as one first measurement set, and determining downlink subframes included in one frame as another first measurement set, where all the downlink subframes may be determined into the same first measurement set, or may be determined into different first measurement sets;

determining, according to the interference report, a flexible subframe having an interference level different from that of a downlink subframe in the subframes corresponding to the interference report, determining each flexible subframe having an interference level different from that of a downlink subframe as one second measurement set, and determining a remaining subframe available for downlink data transmission in one frame as a first measurement set, where the remaining subframe available for downlink data transmission may include only a downlink subframe, or may include both a downlink subframe and a flexible subframe having an interference level the same as that of the downlink subframe;

determining, according to the interference report, a flexible subframe having an interference level different from that of a downlink subframe in the subframes corresponding to the interference report, determining, according to an interference level, the flexible subframe having an interference level different from that of a downlink subframe as at least one second measurement set, where each second measurement set is corresponding to one interference level, and determining a remaining subframe available for downlink data transmission in one frame as a first measurement set;

determining, according to the interference report, a flexible subframe having an interference level different from that of a downlink subframe and a flexible subframe having an interference level the same as that of a downlink subframe in the subframes corresponding to the interference report, determining, according to an interference level, each flexible subframe having an interference level different from that of a downlink subframe as a different second measurement set, determining the flexible subframe having an interference level the same as that of a downlink subframe as one first measurement set, and determining downlink subframes as another first measurement set, where all the downlink subframes included in one frame may be determined into the same first measurement set, or may be determined into different first measurement sets; and determining, according to the interference report, a flexible subframe having an interference level different from that of a downlink subframe and a flexible subframe having an interference level the same as that of a downlink subframe in the subframes corresponding to the interference report, determining, according to an interference level, the flexible subframe having an interference level different from that of a downlink subframe as at least one second measurement set, where each second measurement set is corresponding to one interference level, determining the flexible subframe having an interference level the same as that of a downlink subframe as one first measurement set, and determining all downlink subframes included in one frame as another first measurement set.

As a preferred implementation, the interference report may be generated by the user equipment according to interference measurement performed on a first subframe set.

Preferably, in the embodiment of the present invention, the first subframe set is one of the following sets: a universal set formed by all subframes available for downlink data transmission that are included in one frame or a subset of the universal set, where the universal set or the subset of the universal set includes a flexible subframe; a universal set formed by all flexible subframes included in one frame or a subset of the universal set; and a universal set formed by all flexible subframes having uplink and downlink interference that are included in one frame or a subset of the universal set.

The first subframe set may be obtained in various manners, for example, notifying the first subframe set to the user equipment (the manner may be implemented before the interference report is received from the user equipment), where the first subframe set is a set determined by the user equipment or is a predetermined set.

In another preferred implementation of the embodiment of the present invention, the interference report includes at least one of the following: indication information of a subframe having an interference level different from that of a downlink subframe, interference signal intensity of each subframe measured by the user equipment, and an interference level of each subframe measured by the user equipment.

Preferably, before the interference report is received from the user equipment, trigger information may be further sent to the user equipment, so as to trigger the user equipment to report the interference report. In this embodiment, the user equipment reports the interference report only when receiving a trigger message, so as to avoid that the user equipment continually sends an unnecessary interference report in a case in which the base station does not support that a measurement set is determined according to the interference report, thereby saving a network resource.

Preferably, after step 24, the foregoing method may further include: for each measurement set in the at least two measurement sets, receiving channel state information reported by the user equipment. Then the following operation may further be performed: performing, according to the channel state information, modulation and coding scheme setting and/or power control on subframes in different measurement sets separately.

After each cell dynamically changes a subframe configuration according to a transient service requirement of its user, when a user equipment receives downlink data in different subframes of a cell, encountered interference levels may vary dramatically. Meanwhile, a cell may not know a subframe configuration used by a neighboring cell, so that the cell cannot determine which subframe is subject to strong interference, especially strong interference caused by uplink data transmission of a neighboring UE of a neighboring cell to downlink data reception of a UE in this cell. In this embodiment, according to an interference report of a user equipment, a base station can learn subframes having different interference levels, especially distinguish these subframes subject to strong interference, correspondingly determine a measurement set, report channel state information for each determined measurement set, and perform scheduling according to the reported channel state information, so that a problem that significantly reduced data transmission efficiency in another subframe especially in a downlink subframe due to a strong interference subframe can be effectively solved, thereby improving data transmission efficiency of a system.

Preferably, step 20 and step 22 may be replaced with the following: determining at least two measurement sets for the user equipment, where one measurement set in the at least two measurement sets includes only a flexible subframe. For example, all downlink subframes included in one frame are determined as a first measurement set, and determining all flexible subframes included in one frame as a second measurement set; or determining all downlink subframes included in one frame as a first measurement set, and each flexible subframe in one frame is determined as one second measurement set. According to this embodiment, a base station may also configure a measurement set suitable for measuring channel quality of a flexible subframe for a user without according to an interference report. When no conflict occurs, this embodiment may be used in combination with each of the foregoing embodiments.

An embodiment of the present invention further provides a processing method for channel measurement, and the method can be implemented at a user equipment side.

Figure 3:
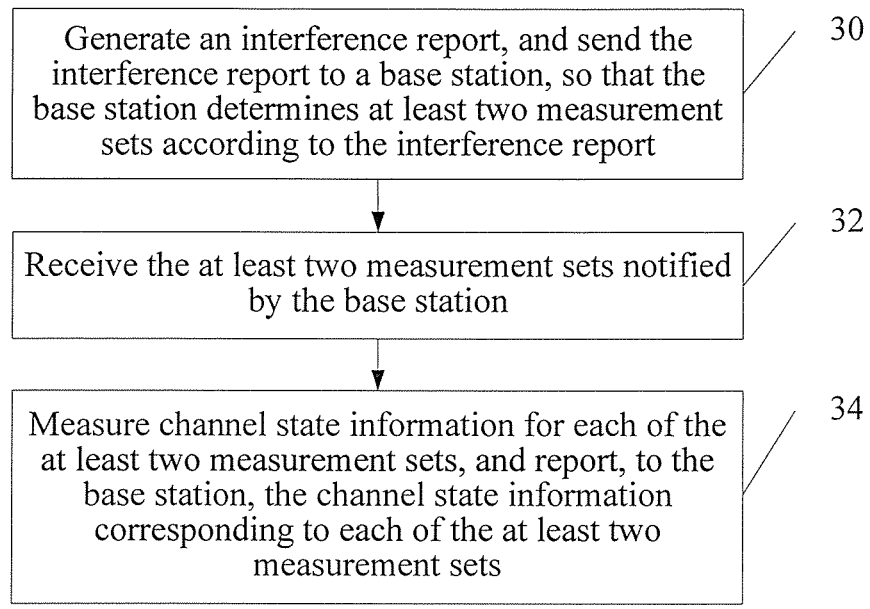
FIG. 3 is a flow chart of a processing method for channel measurement according to a second embodiment of the present invention.

FIG. 3 is a flow chart of a processing method for channel measurement according to a second embodiment of the present invention, and as shown in FIG. 3, the method includes:

Step 30: Generate an interference report, and send the interference report to a base station, so that the base station determines, according to the interference report, at least two measurement sets for the user equipment.

Step 32: Receive the at least two measurement sets notified by the base station.

Step 34: Measure channel state information for each of the at least two measurement sets, and report, to the base station, the channel state information corresponding to each of the at least two measurement sets.

In the prior art, after each cell dynamically changes a subframe configuration according to a transient service requirement of its user, a cell may not know a subframe configuration used by a neighboring cell, so that the cell cannot determine which subframe is subject to strong interference, and in this case, a measurement set determined by a base station itself may not include a subframe having strong interference, and the base station may configure a subframe subject to strong interference (for example, a flexible subframe) and a subframe not having strong interference (for example, a downlink subframe) into the same measurement set, so that channel state information obtained through measurement cannot really reflect channel quality of the subframe subject to strong interference. In this embodiment, the base station can determine a measurement set more accurately according to the interference report reported by the user equipment, so that channel quality of a subframe can be measured accurately.

Preferably, one measurement set in the at least two measurement sets includes only a flexible subframe.

In this embodiment, according to the interference report reported by the user equipment, the base station can determine a measurement set more accurately, so that one measurement set includes only a flexible subframe, the user equipment separately performs channel state information measurement and reporting on subframes belonging to different measurement sets, and channel quality of a subframe having strong interference can be measured accurately.

Preferably, one measurement set in the at least two measurement sets includes only a flexible subframe, and another one or more measurement sets include at least all downlink subframes. For example, a first measurement set and a second measurement set are determined for the user equipment according to the interference report, and the first measurement set and the second measurement set are notified to the user equipment, where the first measurement set includes at least all downlink subframes included in one frame, and the second measurement set includes only a flexible subframe. The first measurement set and the second measurement set may both be one or more measurement sets, and when multiple first measurement sets exist, each first measurement set may include one or more downlink subframes, and all sets of the first measurement sets include all downlink subframes.

In the prior art, the base station may determine a subframe having strong interference and a subframe not having strong interference into the same measurement set, so that channel quality obtained through measurement cannot accurately reflect channel quality of the subframe not having strong interference, thereby affecting data transmission efficiency in the subframe not having strong interference (for example, when scheduling is performed according to channel state information fed back by a user equipment, the data transmission efficiency in the subframe not having the strong interference is reduced significantly). In this embodiment, according to the interference report reported by the user equipment, the base station may determine a measurement set more accurately, so that the subframe having strong interference and the subframe not having strong interference are determined in different measurement sets, the user equipment separately performs channel state information measurement and reporting on subframes belonging to different measurement sets, and therefore, an effect of the strong interference subframe on the subframe not having the strong interference, especially on the downlink subframe, can be reduced.

Preferably, the at least two measurement sets include a first measurement set and a second measurement set, where the second measurement set includes only a flexible subframe, and the first measurement set includes at least one subframe in all subframes included in one frame other than the subframe in the second measurement set. For example, the first measurement set includes at least all downlink subframes included in one frame, and the second measurement set includes only a flexible subframe. The second measurement set may be one or more measurement sets.

Preferably, the second measurement set includes only a flexible subframe having uplink and downlink interference. In this embodiment, a measurement set including only a flexible subframe having uplink and downlink interference exists, so that channel quality of the flexible subframe having uplink and downlink interference can be measured accurately. Therefore, in this embodiment, accuracy of channel measurement is improved.

In a preferred implementation of the embodiment of the present invention, the at least two measurement sets include a first measurement set and a second measurement set, where the first measurement set and the second measurement set are one of the following:

the second measurement set includes only all flexible subframes having uplink and downlink interference in subframes corresponding to the interference report, and the first measurement set includes a remaining subframe available for downlink data transmission in one frame;

each second measurement set includes only one flexible subframe having uplink and downlink interference in subframes corresponding to the interference report, and the first measurement set includes a remaining subframe available for downlink data transmission in one frame;

the second measurement set includes only all flexible subframes having an interference level different from that of a downlink subframe in subframes corresponding to the interference report, and the first measurement set includes a remaining subframe available for downlink data transmission in one frame;

the second measurement set includes only all flexible subframes having an interference level different from that of a downlink subframe in subframes corresponding to the interference report, one first measurement set includes all downlink subframes included in one frame, and another first measurement set includes all flexible subframes having an interference level the same as that of a downlink subframe in the subframes corresponding to the interference report;

each second measurement set includes only one flexible subframe having an interference level different from that of a downlink subframe in subframes corresponding to the interference report, and the first measurement set includes a remaining subframe available for downlink data transmission in one frame;

each second measurement set includes only at least one flexible subframe having an interference level different from that of a downlink subframe in subframes corresponding to the interference report, where the flexible subframe in each second measurement set is corresponding to one interference level, and the first measurement set includes a remaining subframe available for downlink data transmission in one frame;

each second measurement set includes only one flexible subframe having an interference level different from that of a downlink subframe in subframes corresponding to the interference report, one first measurement set includes all downlink subframes included in one frame, and another first measurement set includes all flexible subframes having an interference level the same as that of a downlink subframe in the subframes corresponding to the interference report; and each second measurement set includes only at least one flexible subframe having an interference level different from that of a downlink subframe in subframes corresponding to the interference report, where the flexible subframe in each second measurement set is corresponding to one interference level, one first measurement set includes all downlink subframes included in one frame, and another first measurement set includes all flexible subframes having an interference level the same as that of a downlink subframe in the subframes corresponding to the interference report.

The generating an interference report may be implemented in the following manner: generating the interference report according to interference measurement performed on a first subframe set.

As a preferred implementation of the embodiment of the present invention, the generating the interference report according to interference measurement performed on a first subframe set may include: determining a flexible subframe according to the interference measurement performed on the first subframe set; and generating the interference report, where the interference report includes information of the flexible subframe.

Preferably, the generating the interference report according to interference measurement performed on a first subframe set may be implemented in any one of the following manners:

determining, according to the interference measurement performed on the first subframe set, a subframe having an interference level different from that of a downlink subframe in subframes corresponding to the first subframe set, and generating the interference report, where the interference report includes indication information of the subframe having an interference level different from that of a downlink subframe;

determining, according to the interference measurement performed on the first subframe set, interference signal intensity of each subframe in the first subframe set, and generating the interference report, where the interference report includes the interference signal intensity of each subframe in the first subframe set; and determining, according to the interference measurement performed on the first subframe set, an interference level of each subframe in the first subframe set, and generating the interference report, where the interference report includes the interference level of each subframe in the first subframe set.

In a preferred implementation of the embodiment of the present invention, the first subframe set is one of the following:

a universal set formed by all subframes available for downlink data transmission that are included in one frame or a subset of the universal set, where the universal set or the subset of the universal set includes a flexible subframe;

a universal set formed by all flexible subframes included in one frame or a subset of the universal set; and a universal set formed by all flexible subframes having uplink and downlink interference that are included in one frame or a subset of the universal set.

Preferably, before the generating an interference report, the method further includes one of the following manners: receiving the first subframe set sent by the base station; determining the first subframe set; and obtaining the predetermined first subframe set.

The method further includes:

receiving trigger information sent by the base station; and the sending the interference report to the base station includes: sending the interference report to the base station with triggering of the trigger information.

In this embodiment, the user equipment reports the interference report only when receiving a trigger message, so as to avoid that the user equipment continually sends an unnecessary interference report in a case in which the base station does not support that a measurement set is determined according to the interference report, thereby saving a network resource.

Optionally, step 30 may not be performed, and in this case, the at least two measurement sets received in step 32 may be as follows: The first measurement set includes all downlink subframes in one frame, and the second measurement set includes all flexible subframes in one frame; or the first measurement set includes all downlink subframes in one frame, and each second measurement set includes one flexible subframe. When no conflict occurs, this embodiment may be used in combination with each of the foregoing embodiments.

An embodiment of the present invention provides a method for channel measurement and reporting.

Figure 4:
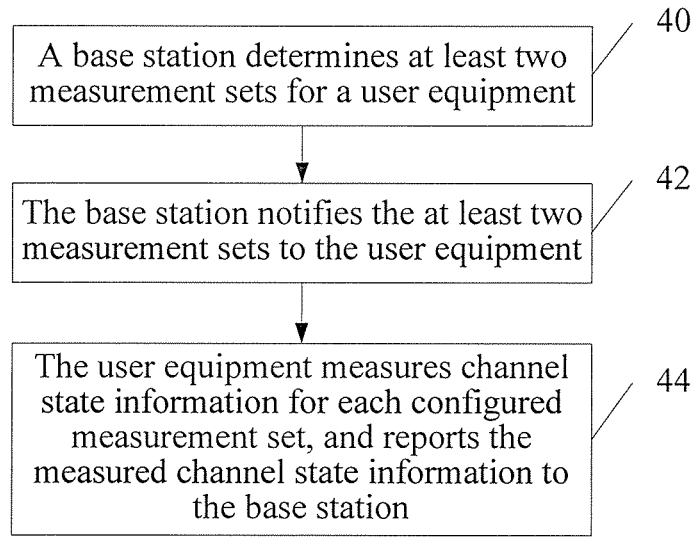
FIG. 4 is a flow chart of a processing method for channel measurement according to a third embodiment of the present invention.

FIG. 4 is a flow chart of a processing method for channel measurement according to a third embodiment of the present invention, and as shown in FIG. 4, the method includes:

Step 40: A base station determines at least two measurement sets for a user equipment. Preferably, one measurement set in the two measurement sets includes only a flexible subframe.

The base station may determine a subframe configuration for the user equipment, and therefore, the base station may know which subframe is a flexible subframe.

A method for dynamically changing a subframe configuration is introduced in the following.

Figure 5:
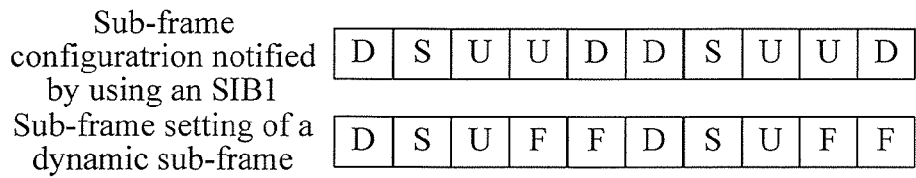
FIG. 5 is a schematic diagram of a dynamical change of a TDD subframe configuration according to the third embodiment of the present invention.

A method for implementing a dynamical change of a TDD subframe configuration is that: In each radio frame, a base station sets a part of subframes to flexible subframes (Flexible Subframe), where the flexible subframe may also be referred to as a dynamic subframe (Dynamic Subframe); and notifies a UE which subframes are set to the flexible subframes. At each transmission moment, according to uplink and downlink service requirements of the user equipment, these dynamic subframes can be used by the base station dynamically for transmitting uplink data or downlink data. As shown in FIG. 5, the base station notifies a subframe configuration 1 to the UE by using a system information block (System Information Block, SIB for short); In addition, the base station may also notify, by using a radio resource control (Radio Resource Control, RRC) message, the UE to set a subframe 3, a subframe 4, a subframe 8 and a subframe 9 to dynamic subframes, where D represents a downlink subframe, S represents a special subframe, U represents an uplink subframe, and F represents a dynamic subframe. For a dynamic subframe, the base station may explicitly or implicitly indicate, by using signaling (for example, physical layer signaling), that each dynamic subframe is used for transmission of uplink data or used for transmission of downlink data. Obviously, the dynamic subframe may be used for uplink data transmission, or may be used for downlink data transmission, and is an expression form of a flexible subframe.

Figure 6:
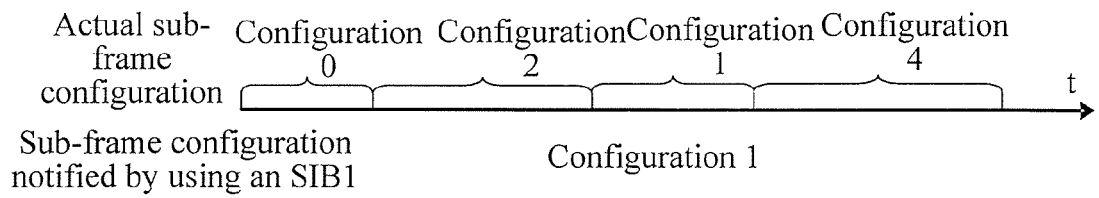
FIG. 6 is a schematic diagram of another dynamical change of a TDD subframe configuration according to the third embodiment of the present invention.

Another method for implementing a dynamical change of a TDD subframe configuration is that: In addition to a subframe configuration notified by using an SIB1, a base station further introduces new signaling to notify an actually used subframe configuration X and its valid time to a UE, so that the UE clearly learns when each subframe of each radio frame is used for uplink data transmission and when each subframe of each radio frame is used for downlink data transmission. In the prior art, the subframe configuration notified by using the SIB1 needs at least 640 ms to be changed. In this method, by using the actually used subframe configuration X notified by using the introduced new signaling, the base station can implement a rapid subframe configuration change without updating a system message, so as to implement a TDD subframe dynamic change, thereby better matching uplink and downlink service requirements of the UE. That is, the subframe configuration X is set according to uplink and downlink service requirements of the UE, and the base station performs communication with the UE by using the subframe configuration X, so that service transmission can be completed more effectively. For example, as shown in FIG. 6, a subframe configuration notified by using an SIB1 message is a subframe configuration 1, and the base station further notifies, by using an RRC message, an actually used subframe configuration X and its valid time to the UE. According to a user service requirement, when the base station performs communication with the UE in different times, the actually used subframe configurations X are subframe configurations 0, 2, 1, and 4. Obviously, when the actually used subframe configuration X is flexible, some subframes may be used for uplink transmission or downlink data transmission in different times, which is another expression form of the flexible subframe. For example, when the actually used subframe configurations X are the subframe configurations 0, 2, 1, and 4, according to Table 1, a subframe 3, a subframe 4, a subframe 7, a subframe 8 and a subframe 9 are flexible subframes.

Optionally, before determining the at least two measurement sets, the base station may receive the interference report from the user equipment, so as to determine the at least two measurement sets according to a measurement report of the UE.

Preferably, the interference report may be generated by the user equipment according to interference measurement performed on a first subframe set. Optionally, the first subframe set includes at least one flexible subframe.

Figure 1:
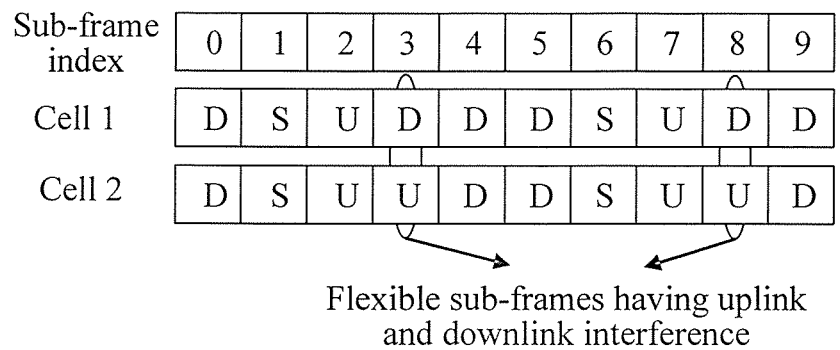
FIG. 1 is a schematic diagram of interference between uplink and downlink services of neighboring cells in the prior art.

Preferably, the first subframe set may be notified by the base station to the user equipment, or may be determined by the user equipment itself, or may be preset in the user equipment (for example, a first subframe set is specified in a protocol in advance, and the specified first subframe set is preset in the user equipment). The first subframe set may be a set including a flexible subframe. For example, the first subframe set may be a universal set formed by all subframes possibly available for downlink data transmission that are included in one frame or a subset of the universal set, or a universal set formed by all subframes possibly available for downlink data transmission or possibly available for uplink data transmission that are included in one frame or a subset of the universal set, or a universal set formed by all flexible subframes having uplink and downlink interference that are included in one frame or a subset of the universal set. When the first subframe set is notified by the base station to the user equipment and when performing communication with the user equipment, the base station may notify, to the user equipment, all subframes possibly available for downlink data transmission that are included in one frame; or may explicitly or implicitly notify, to the user equipment, a subframe possibly available for downlink data transmission and also possibly available for uplink data transmission by using signaling. By using FIG. 5 as an example, when the base station notifies the user equipment to set the subframes 3, 4, 8 and 9 to dynamic subframes, only the dynamic subframes are possibly available for downlink data transmission and also possibly available for uplink data transmission, which is equivalent to implicitly notifying that the first subframe set includes the subframes 3, 4, 8 and 9. As shown in FIG. 6, actually used subframe configurations notified by using newly added signaling are the subframe configurations 0, 2, 1 and 4, and in combination with a subframe use situation of the four subframe configurations, the subframes 3, 4, 7, 8 and 9 are possibly available for downlink data transmission and also possibly available for uplink data transmission, which is equivalent to implicitly notifying that the first subframe set includes the subframes 3, 4, 7, 8 and 9; and it is also may be that the base station notifies, according to subframe configurations used by a local cell and a surrounding cell, flexible subframes having uplink and downlink interference, for example, the subframes 3 and 8 shown in FIG. 1 to the user equipment. When the first subframe set is determined by the user equipment, the user equipment first acquires subframe configurations used by a local cell and a surrounding cell, and further acquires flexible subframe having uplink and downlink interference as the first subframe set. When the first subframe set is specified in advance (for example, specified in advance in a protocol), according to a subframe configuration supported by the protocol, all subframes possibly available for downlink data transmission that are included in one frame are used as the first subframe set, for example, for an LTE TDD system supporting seven subframe configurations shown in Table 1, it is specified (for example, specified in the protocol) that the first subframe set includes subframes 0, 1, 3, 4, 5, 6, 7, 8 and 9; or all subframes possibly available for downlink data transmission and also possibly available for uplink data transmission that are included in one frame are used as the first subframe set, for example, for an LTE TDD system supporting seven subframe configurations shown in Table 1, it is specified (for example, specified in the protocol) that the first subframe set includes the subframes 3, 4, 7, 8 and 9.

As described in the foregoing, the first subframe set may be notified by the base station to the user equipment, and the base station may determine that the user equipment performs interference measurement only in a flexible subframe. In this case, the base station may directly monitor a signal sent by a surrounding cell, acquire a subframe configuration used by the surrounding cell, and determine, according to a subframe configuration used by a local cell, which subframes are flexible subframes; and it may also be that a central node, for example, a macro base station or a core network device notifies the base station which subframes in the local cell are flexible subframes. After the base station determines which subframes are flexible subframes, these subframes may be determined as the first subframe set, and the first subframe set is notified to the user equipment, so that the user equipment performs interference measurement on these flexible subframes.

For a subframe in the first subframe set, the user equipment performs interference measurement, generates an interference report and sends the interference report to the base station. The interference report may be used to indicate interference signal intensity or an interference level obtained through measurement performed on each subframe in the first subframe set, or may be used to indicate indication information of a subframe having an interference level different from that of a downlink subframe. One or more interference intensity intervals may be set as one interference level, for example, interference intensity of 0-2 dB is set as an interference level 1, and interference intensity of 3-5 dB is set as an interference level 2. If the interference signal intensity obtained through measurement performed on each subframe is reported directly, a large reporting overhead may be caused, and in consideration that a main objective that the user equipment reports the interference report is to help the base station distinguish different levels of interference to which different subframes are subject, and the interference intensity obtained through measurement may be classified into different interference levels, for example, classified into two levels, namely high interference and low interference, so that the reporting overhead of the user equipment can be effectively reduced. In addition, the subframes in the first subframe set may be directly classified into different subframe sets according to the interference levels obtained through measurement, and then reported to the base station. That is, the interference report may further be used to indicate at least one second subframe set, where subframes belonging to different second subframe sets are subject to interference of different levels.

For a TDD system, according to its supported subframe configuration types, some subframes always used for downlink data transmission or always used for uplink data transmission may exist. For example, the LTE TDD system supports the seven subframe configurations shown in Table 1, the subframes 0, 1, 5 and 6 are always used for downlink data transmission but cannot be used for uplink data transmission, and the subframe 2 is always used for uplink data transmission but cannot be used for downlink data transmission. It can be seen that, a downlink subframe is used for downlink data transmission in both a local cell and a surrounding cell, that is, only interference from a same direction exists, and the interference level experienced by the downlink subframe is relatively stable; for a flexible subframe, uplink and downlink interference may exist, levels of interference to which different flexible subframes are subject are unstable, and particularly, when that a UE of a neighboring cell sends uplink data causes strong interference to that a UE of a local cell receives downlink data, in this case, a level of interference to which the flexible subframe is subject is obviously higher than a level of interference to which the downlink subframe is subject. For downlink subframes, because interference levels are rather stable, interference measurement may be performed on the downlink subframes together to obtain an average level of interference to which the downlink subframes are subject; and for the flexible subframe, because interference levels of different flexible subframes are unstable, after interference averaging is performed on the different flexible subframes, interference situation of each flexible subframe cannot be reflected correctly. Preferably, for flexible subframes having different subframe indexes but belonging to the same first subframe set, interference measurement is performed separately, and interference averaging is not performed on the different flexible subframes. Preferably, when the interference report is used to indicate at least one second subframe set, the second subframe set is formed by a flexible subframe, and a level of interference to which the flexible subframe is subject is different from a level of interference to which a downlink subframe is subject. For example, interference intensity of a subframe in the first subframe set is compared with the interference in the downlink subframe, and a subframe in the first subframe set and having an interference level different from that of the downlink subframe is used as a subframe in the second subframe set, and is indicated in the reference report. The user equipment may also perform interference measurement on a subframe available for downlink data transmission that does not belong to the first subframe set. For example, when the first subframe set is a universal set formed by all flexible subframes included in one frame, the user equipment may also perform interference measurement for the downlink subframes, compare an interference level obtained through measurement performed on each flexible subframe with an interference level obtained through measurement performed on the downlink subframe, and report, in the interference report, flexible subframes having an interference level different from that of the downlink subframe. When the interference report is used to indicate the indication information of the subframe having an interference level different from that of a downlink subframe, the interference report may be directly indicate a subframe index of the subframe having an interference level different from that of a downlink subframe, or a bitmap may be used to indicate whether an interference level to which each subframe is subject in the first subframe set is the same as a level of interference to which a downlink subframe is subject. For example, it is assumed that the first subframe set includes the subframe 3, the subframe 4, the subframe 7, the subframe 8 and the subframe 9, the interference report is formed by a bitmap (Bitmap) of five bits, where the five bits is in descending order, each bit is corresponding to one subframe, a bit whose value is 0 indicates that a level of interference to which a corresponding subframe is subject is the same as that of the downlink subframe, and a bit whose value is 1 indicates a level of interference to which a corresponding subframe is subject is different from that of the downlink subframe. In this case, when a value of the interference report reported by the user equipment to the base station is 01011, the base station may learn that levels of interference to which the subframe 3 and the subframe 7 are subject are the same as that of the downlink subframe, and levels of interference to which the subframe 4, the subframe 8 and the subframe 9 are subject are different from that of the downlink subframe.

Preferably, before the interference report is received from the user equipment, the method may further include: sending trigger information to the user equipment, so as to trigger the user equipment to report the interference report. The LTE TDD system is an ever-evolving system, and a UE of an evolved release (for example, a UE of a release 12) needs to be capable of accessing a base station of an earlier release (for example, a release 8) for performing normal communication. The base station of the release 8 cannot parse the interference report correctly. In addition, when a dynamic re-determining function of a TDD subframe configuration is not started, neighboring cells always use the same subframe configuration, interference caused due to different uplink and downlink of the same subframe does not exist, and the UE may not report the interference report. Therefore, preferably, in this embodiment, the base station triggers the user equipment to report the interference report. Preferably, when a cell starts a dynamic re-determining function of a TDD subframe configuration, the base station sends trigger information to the user equipment. The trigger information may be start information of a dynamic re-determining function of a TDD subframe configuration, or first subframe set notification information, or an additional information bit. When the user equipment is triggered, by using the additional information bit, to report the interference report, the addition information bit may be included in one or more types of: a broadcast message, a radio resource control message, medium access control layer signaling, and a physical layer control message. For example, an additional one bit may be used in physical downlink control information to indicate to the user equipment that the interference report is triggered. One piece of trigger information may trigger the user equipment to report the interference report once or multiple times. For example, the user equipment, after receiving the trigger information, always reports the interference report, until receiving information indicating that the user equipment does not need to report the interference report.

If the base station receives the interference report, the determining at least two measurement sets for the user equipment in step 40 may include that: The base station determines, according to the interference report, the at least two measurement sets for the user equipment, where each measurement set includes at least one subframe.

According to an interference measurement result indicated by the interference report, the base station determines the at least two measurement sets for the user equipment and notifies the at least two measurement sets to the user equipment, where each measurement set includes at least one subframe. Subframes included in different measurement sets are not overlapped to each other. For subframes belonging to the same measurement set, interference intensity obtained through measurement is close or interference levels obtained through measurement are the same. Preferably, the at least two measurement sets include a first measurement set and a second measurement set, where the first measurement set includes at least one downlink subframe, and the second measurement set includes only a flexible subframe. According to this embodiment, the downlink subframe and the flexible subframe may be located in different measurement sets, and the user equipment performs measurement according to such measurement sets, so as to avoid a large interference difference between subframes in the same measurement set, and therefore, channel quality of the downlink subframe and the flexible subframe can be measured accurately.

A manner for determining measurement sets may be any one of the following:

determining all downlink subframes as a first measurement set, and determining all flexible subframes as a second measurement set;

determining all downlink subframes as a first measurement set, and determining each flexible subframe as one second measurement set, where in the two embodiments, the base station acquires, according to determination for a local cell or according to interaction with a base station in a neighboring cell, which subframes are flexible subframes and which subframes are downlink subframes, so as to determine the flexible subframes and the downlink subframes into different measurement sets, so that channel quality of the downlink subframes and the flexible subframes can be measured accurately, and moreover, the base station determines the flexible subframes and the downlink subframes according to determination of the base station itself and the interaction with the base station in the neighboring cell, which also has an advantage of easy implementation;

determining all subframes having uplink and downlink interference as a second measurement set, and determining a remaining subframe possibly available for downlink data transmission as a first measurement set;

determining each flexible subframe having uplink and downlink interference as one second measurement set, and determining a remaining subframe possibly available for downlink data transmission as a first measurement set, where in the two embodiments, the base station may acquire, according to the interference report sent by the user equipment, which subframes are flexible subframes having uplink and downlink interference, so as to determine the flexible subframes having uplink and downlink interference and the downlink subframes into different measurement sets, and generally, the flexible subframe having uplink and downlink interference and the downlink subframe have different channel quality, and therefore, by using the two embodiments, channel quality of the downlink subframe and the flexible subframe having uplink and downlink interference can be measured accurately;

determining a flexible subframe having an interference level different from that of a downlink subframe as a second measurement set, and determining a flexible subframe having an interference level the same as that of a downlink subframe and all downlink subframes as a first measurement set;

determining, according to a different interference level, a flexible subframe having an interference level different from that of a downlink subframe as a different second measurement set, and determining a flexible subframe having an interference level the same as that of a downlink subframe and all downlink subframes as a first measurement set;

determining a flexible subframe having an interference level different from that of a downlink subframe as a second measurement set, determining a flexible subframe having an interference level the same as that of a downlink subframe as one first measurement set, and determining downlink subframes as another first measurement set;

determining, according to an interference level, a flexible subframe having an interference level different from that of a downlink subframe as a different second measurement set, determining a flexible subframe having an interference level the same as that of a downlink subframe as one first measurement set, and determining downlink subframes as another first measurement set, where in the two embodiments, the base station may acquire, according to the interference report sent by the user equipment, which subframes are flexible subframes having an interference level different from that of a downlink subframe, so as to determine the flexible subframes having an interference level different from that of a downlink subframe and the downlink subframes into different measurement sets, and generally, the flexible subframe having an interference level different from that of a downlink subframe and the downlink subframe have different channel quality, and therefore, by using the two embodiments, channel quality of the downlink subframe and the flexible subframe having an interference level different from that of a downlink subframe can be measured accurately; and preferably, determining subframes having the same interference level into the same measurement set, and determining subframes having different interference levels into different measurement sets, for example, determining a flexible subframe having an interference level different from that of a downlink subframe as at least one second measurement set, where each second measurement set is corresponding to one interference level, and determining a remaining subframe available for downlink data transmission in one frame as a first measurement set; or, determining a flexible subframe having an interference level different from that of a downlink subframe as at least one second measurement set, where each second measurement set is corresponding to one interference level, determining a flexible subframe having an interference level the same as that of a downlink subframe as one first measurement set, and determining all downlink subframes included in one frame as another first measurement set. In this embodiment, the subframes having the same interference level are determined in the same measurement set, so as to avoid a large difference between channel quality of the subframes in the same measurement set, and therefore, channel quality can be measured accurately.

Step 44: The user equipment performs channel state information measurement for each determined measurement set, and reports channel state information corresponding to each measurement set to the base station; and the base station receives, for each determined measurement set, the reported channel state information from the user equipment.

The channel state information includes at least one type of information including a rank indication, a pre-coding matrix indication, and channel quality indication information.

According to the channel state information reported by the user equipment, the base station performs data scheduling, and sets a transmission format and transmission power of data. Preferably, modulation and coding scheme (Modulation and Coding Scheme, MCS for short) setting and/or power control is performed on subframes in different measurement sets separately. For the power control, a common manner is that: A base station notifies a transmission power adjustment amount to a user equipment, and the user equipment performs power adjustment according to transmission power of previous data transmission and the notified transmission power adjustment amount. The performing power control on subframes in different measurement sets separately specifically indicates that: When the transmission power adjustment is performed, the adjustment is performed according to transmission power of previous data transmission of a subframe in this measurement set. In addition, settings of different power control parameter may be performed on the subframes in the different measurement sets.

Figure 7:
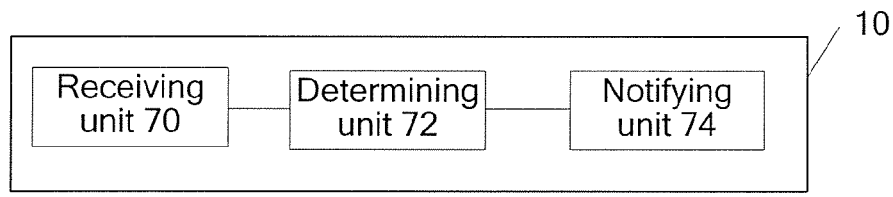
FIG. 7 is a structural diagram of a base station according to a fourth embodiment of the present invention.

An embodiment of the present invention further provides an apparatus embodiment for implementing steps and methods in the foregoing method embodiments. The embodiment of the present invention may be applied to a base station or a terminal in various communications systems. An embodiment of the present invention further provides a base station, where the base station may be configured to implement the method embodiment related to the base station in the foregoing. FIG. 7 is a structural diagram of a base station according to a fourth embodiment of the present invention, and as shown in FIG. 7, the base station 10 includes: a receiving unit 70, a determining unit 72, and a notifying unit 74. The structure of the base station is illustrated in the following.

The receiving unit 70 is configured to receive an interference report from a user equipment.

The determining unit 72 is configured to determine, according to the interference report received by the receiving unit 70, at least two measurement sets for the user equipment.

The notifying unit 74 is configured to notify the at least two measurement sets determined by the determining unit 72 to the user equipment.

Preferably, one measurement set (for example, a second measurement set) in the at least two measurement sets includes only at least one flexible subframe.

Optionally, another one or more measurement sets (for example, a first measurement set) include at least all downlink subframes included in one frame.

Optionally, the base station may not include the receiving unit 70 configured to receive the interference report from the user equipment, and in this case, the determining unit 72 is configured to determine the at least two measurement sets for the user equipment.

Preferably, the determining unit 72 is configured to determine, according to the interference report, at least one flexible subframe in subframes corresponding to the interference report, determine the determined at least one flexible subframe as a second measurement set, and determine at least one subframe in all subframes included in one frame other than the subframe in the second measurement set as a first measurement set.

The determined at least one flexible subframe may be a flexible subframe having uplink and downlink interference.

In a preferred implementation of the embodiment of the present invention, the determining unit 72 determines, according to the interference report, the at least two measurement sets for the user equipment in one of the following manners:

determining, according to the interference report, all flexible subframes having uplink and downlink interference in the subframes corresponding to the interference report, determining all the flexible subframes having uplink and downlink interference in the subframes corresponding to the interference report as a second measurement set, and determining a remaining subframe available for downlink data transmission in one frame as a first measurement set;

determining, according to the interference report, all flexible subframes having uplink and downlink interference in the subframes corresponding to the interference report, determining each flexible subframe having uplink and downlink interference as one second measurement set, and determining a remaining subframe available for downlink data transmission in one frame as a first measurement set;

determining, according to the interference report, a flexible subframe having an interference level different from that of a downlink subframe in the subframes corresponding to the interference report, determining the flexible subframe having an interference level different from that of a downlink subframe as a second measurement set, and determining a remaining subframe available for downlink data transmission in one frame as a first measurement set;

determining, according to the interference report, a flexible subframe having an interference level different from that of a downlink subframe and a flexible subframe having an interference level the same as that of a downlink subframe in the subframes corresponding to the interference report, determining the flexible subframe having an interference level different from that of a downlink subframe as a second measurement set, determining the flexible subframe having an interference level the same as that of a downlink subframe as one first measurement set, and determining all downlink subframes included in one frame as another first measurement set;

determining, according to the interference report, a flexible subframe having an interference level different from that of a downlink subframe in the subframes corresponding to the interference report, determining each flexible subframe having an interference level different from that of a downlink subframe as one second measurement set, and determining a remaining subframe available for downlink data transmission in one frame as a first measurement set;

determining, according to the interference report, a flexible subframe having an interference level different from that of a downlink the subframe in subframes corresponding to the interference report, determining, according to an interference level, the flexible subframe having an interference level different from that of a downlink subframe as at least one second measurement set, where each second measurement set is corresponding to one interference level, and determining a remaining subframe available for downlink data transmission in one frame as a first measurement set;

determining, according to the interference report, a flexible subframe having an interference level different from that of a downlink subframe and a flexible subframe having an interference level the same as that of a downlink subframe in the subframes corresponding to the interference report, determining each flexible subframe having an interference level different from that of a downlink subframe as one second measurement set, determining the flexible subframe having an interference level the same as that of a downlink subframe as one first measurement set, and determining all downlink subframes included in one frame as another first measurement set; and determining, according to the interference report, a flexible subframe having an interference level different from that of a downlink subframe and a flexible subframe having an interference level the same as that of a downlink subframe in the subframes corresponding to the interference report, determining, according to an interference level, the flexible subframe having an interference level different from that of a downlink subframe as at least one second measurement set, where each second measurement set is corresponding to one interference level, determining the flexible subframe having an interference level the same as that of a downlink subframe as one first measurement set, and determining all downlink subframes included in one frame as another first measurement set.

Preferably, the interference report may be generated by the user equipment according to interference measurement performed on a first subframe set.

The first subframe set may be one of the following: a universal set formed by all subframes available for downlink data transmission that are included in one frame or a subset of the universal set, where the universal set or the subset of the universal set includes a flexible subframe; a universal set formed by all flexible subframes included in one frame or a subset of the universal set; and a universal set fanned by all flexible subframes having uplink and downlink interference that are included in one frame or a subset of the universal set.

Preferably, the notifying unit 74 is further configured to: before the base station receives the interference report from the user equipment, notify the first subframe set to the user equipment. Optionally, the first subframe set may also be a set determined by the user equipment or may be a predetermined set.

As a preferred implementation of the embodiment of the present invention, the interference report includes at least one of the following: indication information of a subframe having an interference level different from that of a downlink subframe, interference signal intensity of each subframe measured by the user equipment, and an interference level of each subframe measured by the user equipment.

Preferably, the notifying unit 74 is further configured to: before the base station receives the interference report from the user equipment, send trigger information to the user equipment, so as to trigger the user equipment to report the interference report.

The receiving unit 70 is further configured to: for each measurement set in the at least two measurement sets, receive channel state information reported by the user equipment.

In another preferred implementation of the embodiment of the present invention, the determining unit 74 is further configured to perform, according to the channel state information, modulation and coding scheme setting and/or power control on subframes in different measurement sets separately.

Figure 8:
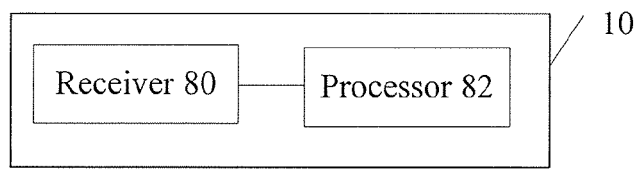
FIG. 8 is a structural diagram of a base station according to a fifth embodiment of the present invention.

An embodiment of the present invention further provides a base station, where the base station may be configured to implement the method embodiment related to the base station in the foregoing. FIG. 8 is a structural diagram of a base station according to a fifth embodiment of the present invention, and as shown in FIG. 8, the base station 10 includes: a receiver 80 and a processor 82. The structure of the base station is illustrated in the following.

The receiver 80 is configured to receive an interference report from a user equipment.

The processor 82 is configured to determine, according to the interference report received by the receiver 80, at least two measurement sets for the user equipment, and notify the at least two measurement sets to the user equipment.

Preferably, one measurement set in the at least two measurement sets includes only a flexible subframe, and optionally, another one or more measurement sets include at least all downlink subframes included in one frame.

Preferably, the processor 82 determines, according to the interference report, the at least two measurement sets for the user equipment in the following manner: determining, according to the interference report, at least one flexible subframe in subframes corresponding to the interference report; determining the determined at least one flexible subframe as a second measurement set, and determining at least one subframe in all subframes included in one frame other than the subframe in the second measurement set as a first measurement set.

The determined at least one flexible subframe may be a flexible subframe having uplink and downlink interference.

Preferably, the processor 82 is configured to determine, according to the interference report, the at least two measurement sets for the user equipment in one of the following manners:

determining, according to the interference report, all flexible subframes having uplink and downlink interference in the subframes corresponding to the interference report, determining all the flexible subframes having uplink and downlink interference in the subframes corresponding to the interference report as a second measurement set, and determining a remaining subframe available for downlink data transmission in one frame as a first measurement set;

determining, according to the interference report, all flexible subframes having uplink and downlink interference in the subframes corresponding to the interference report, determining each flexible subframe having uplink and downlink interference as one second measurement set, and determining a remaining subframe available for downlink data transmission in one frame as a first measurement set;

determining, according to the interference report, a flexible subframe having an interference level different from that of a downlink subframe in the subframes corresponding to the interference report, determining the flexible subframe having an interference level different from that of a downlink subframe as a second measurement set, and determining a remaining subframe available for downlink data transmission in one frame as a first measurement set;

determining, according to the interference report, a flexible subframe having an interference level different from that of a downlink subframe and a flexible subframe having an interference level the same as that of a downlink subframe in the subframes corresponding to the interference report, determining the flexible subframe having an interference level different from that of a downlink subframe as a second measurement set, determining the flexible subframe having an interference level the same as that of a downlink subframe as one first measurement set, and determining all downlink subframes included in one frame as another first measurement set;

determining, according to the interference report, a flexible subframe having an interference level different from that of a downlink subframe in the subframes corresponding to the interference report, determining each flexible subframe having an interference level different from that of a downlink subframe as one second measurement set, and determining a remaining subframe available for downlink data transmission in one frame as a first measurement set;

determining, according to the interference report, a flexible subframe having an interference level different from that of a downlink subframe in the subframes corresponding to the interference report, determining, according to an interference level, the flexible subframe having an interference level different from that of a downlink subframe as at least one second measurement set, where each second measurement set is corresponding to one interference level, and determining a remaining subframe available for downlink data transmission in one frame as a first measurement set;

determining, according to the interference report, a flexible subframe having an interference level different from that of a downlink subframe and a flexible subframe having an interference level the same as that of a downlink subframe in the subframes corresponding to the interference report, determining each flexible subframe having an interference level different from that of a downlink subframe as one second measurement set, determining the flexible subframe having an interference level the same as that of a downlink subframe as one first measurement set, and determining all downlink subframes included in one frame as another first measurement set; and determining, according to the interference report, a flexible subframe having an interference level different from that of a downlink subframe and a flexible subframe having an interference level the same as that of a downlink subframe in the subframes corresponding to the interference report, determining, according to an interference level, the flexible subframe having an interference level different from that of a downlink subframe as at least one second measurement set, where each second measurement set is corresponding to one interference level, determining the flexible subframe having an interference level the same as that of a downlink subframe as one first measurement set, and determining all downlink subframes included in one frame as another first measurement set.

Preferably, the interference report may be generated by the user equipment according to interference measurement performed on a first subframe set.

As an exemplary implementation of the present invention of the present invention, the first subframe set may be one of the following: a universal set formed by all subframes available for downlink data transmission that are included in one frame or a subset of the universal set, where the universal set or the subset of the universal set includes a flexible subframe; a universal set formed by all flexible subframes included in one frame or a subset of the universal set; and a universal set formed by all flexible subframes having uplink and downlink interference that are included in one frame or a subset of the universal set.

Figure 9:
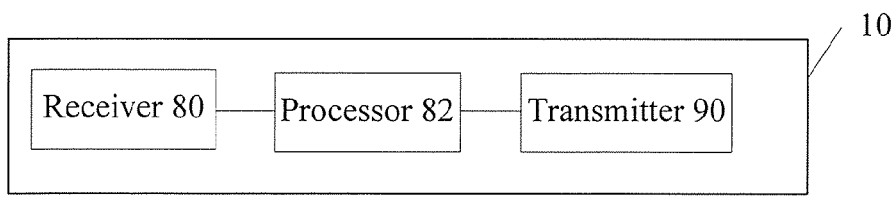
FIG. 9 is a preferred structural diagram of a base station according to the fifth embodiment of the present invention.

Preferably, FIG. 9 is a preferred structural diagram of a base station according to the fifth embodiment of the present invention, and as shown in FIG. 9, the base station 10 further includes: a transmitter 90, configured to: before the base station receives the interference report of the user equipment, notify the first subframe set to the user equipment. Optionally, the first subframe set may also be a set determined by the user equipment or may be a predetermined set.

In another preferred implementation of the embodiment of the present invention, the interference report includes at least one of the following: indication information of a subframe having an interference level different from that of a downlink subframe, interference signal intensity of each subframe measured by the user equipment, and an interference level of each subframe measured by the user equipment.

The base station may further include: the transmitter 90, configured to: before the base station receives the interference report from the user equipment, send trigger information to the user equipment, so as to trigger the user equipment to report the interference report.

Preferably, the receiver 80 is further configured to: for each measurement set in the at least two measurement sets, receive channel state information reported by the user equipment.

Preferably, the processor 82 may further be configured to perform, according to the channel state information, modulation and coding scheme setting and/or power control on subframes in different measurement sets separately.

Figure 10:
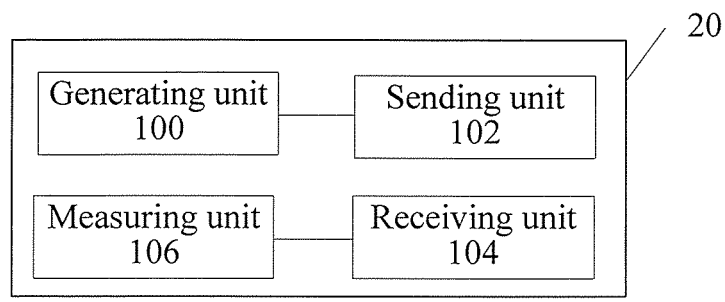
FIG. 10 is a structural diagram of a user equipment according to a sixth embodiment of the present invention.

An embodiment of the present invention further provides a user equipment, where the user equipment may be configured to implement the method embodiment related to the user equipment in the foregoing. FIG. 10 is a structural diagram of a user equipment according to a sixth embodiment of the present invention, and as shown in FIG. 10, the user equipment 20 includes: a generating unit 100, a sending unit 102, a receiving unit 104, and a measuring unit 106. The structure of the user equipment is illustrated in the following.

The generating unit 100 is configured to generate an interference report.

The sending unit 102 is configured to send the interference report generated by the generating unit 100 to a base station, so that the base station determines, according to the interference report, at least two measurement sets for the user equipment.

The receiving unit 104 is configured to receive the at least two measurement sets notified by the base station.

The measuring unit 106 is configured to measure channel state information for each of the at least two measurement sets received by the receiving unit 104.

The sending unit 104 is further configured to report, to the base station, the channel state information that is corresponding to each of the at least two measurement sets and is measured by the measuring unit 106.

Preferably, the at least two measurement sets are determined by the base station for the user equipment according to the interference report, one measurement set (for example, a second measurement set) in the at least two measurement sets includes only a flexible subframe, and preferably, another one or more measurement set (for example, a first measurement set) includes at least all downlink subframes included in one frame.

Preferably, the at least two measurement sets include a first measurement set and a second measurement set, where the second measurement set includes only a flexible subframe, and the first measurement set includes at least one subframe in all subframes included in one frame other than the subframe in the second measurement set.

The determined at least one flexible subframe is a flexible subframe having uplink and downlink interference.

Preferably, the at least two measurement sets include a first measurement set and a second measurement set, and the first measurement set and the second measurement set are one of the following:

the second measurement set includes only all flexible subframes having uplink and downlink interference in subframes corresponding to the interference report, and the first measurement set includes a remaining subframe available for downlink data transmission in one frame;

each second measurement set includes only one flexible subframe having uplink and downlink interference in subframes corresponding to the interference report, and the first measurement set includes a remaining subframe available for downlink data transmission in one frame;

the second measurement set includes only all flexible subframes having an interference level different from that of a downlink subframe in subframes corresponding to the interference report, and the first measurement set includes a remaining subframe available for downlink data transmission in one frame;

the second measurement set includes only all flexible subframes having an interference level different from that of a downlink subframe in subframes corresponding to the interference report, one first measurement set includes all downlink subframes included in one frame, and another first measurement set includes all flexible subframes having an interference level the same as that of a downlink subframe in the subframes corresponding to the interference report;

each second measurement set includes only one flexible subframe having an interference level different from that of a downlink subframe in subframes corresponding to the interference report, and the first measurement set includes a remaining subframe available for downlink data transmission in one frame;

each second measurement set includes only at least one flexible subframe having an interference level different from that of a downlink subframe in subframes corresponding to the interference report, where the flexible subframe in each second measurement set is corresponding to one interference level, and the first measurement set includes a remaining subframe available for downlink data transmission in one frame;

each second measurement set includes only one flexible subframe having an interference level different from that of a downlink subframe in subframes corresponding to the interference report, one first measurement set includes all downlink subframes included in one frame, and another first measurement set includes all flexible subframes having an interference level the same as that of a downlink subframe in the subframes corresponding to the interference report; and each second measurement set includes only at least one flexible subframe having an interference level different from that of a downlink subframe in subframes corresponding to the interference report, where the flexible subframe in each second measurement set is corresponding to one interference level, one first measurement set includes all downlink subframes included in one frame, and another first measurement set includes all flexible subframes having an interference level the same as that of a downlink subframe in the subframes corresponding to the interference report.

Preferably, the generating unit 100 is configured to generate the interference report according to interference measurement performed on a first subframe set.

Preferably, the generating unit 100 is configured to determine a flexible subframe according to the interference measurement performed on the first subframe set; and generate the interference report, where the interference report includes information of the flexible subframe.

As a preferred implementation of the embodiment of the present invention, the generating unit 100 is configured to generate, according to the interference measurement performed on the first subframe set, the interference report in one of the following manners:

determining, according to the interference measurement performed on the first subframe set, a subframe having an interference level different from that of a downlink subframe in subframes corresponding to the first subframe set, and generating the interference report, where the interference report includes indication information of the subframe having an interference level different from that of a downlink subframe;

determining, according to the interference measurement performed on the first subframe set, interference signal intensity of each subframe in the first subframe set, and generating the interference report, where the interference report includes the interference signal intensity of each subframe in the first subframe set; and determining, according to the interference measurement performed on the first subframe set, an interference level of each subframe in the first subframe set, and generating the interference report, where the interference report includes the interference level of each subframe in the first subframe set.

Preferably, the first subframe set may be one of the following: a universal set formed by all subframes available for downlink data transmission that are included in one frame or a subset of the universal set, where the universal set or the subset of the universal set includes a flexible subframe; a universal set formed by all flexible subframes included in one frame or a subset of the universal set; and a universal set formed by all flexible subframes having uplink and downlink interference that are included in one frame or a subset of the universal set.

Figure 11:
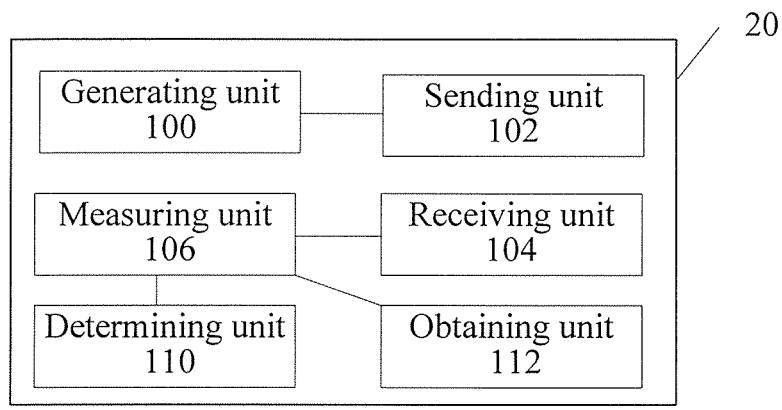
FIG. 11 is a preferred structural diagram of a user equipment according to the sixth embodiment of the present invention.

FIG. 11 is a preferred structural diagram of a user equipment according to the sixth embodiment of the present invention, and as shown in FIG. 11, preferably, the first subframe set may be obtained in one of the following manners:

the receiving unit 104 is further configured to receive the first subframe set sent by the base station; and the user equipment further includes a determining unit 110, configured to determine the first subframe set; and the user equipment further includes an obtaining unit 112, configured to obtain the predetermined first subframe set. One user equipment may include only the determining unit 110 or the obtaining unit 112, or may include both the determining unit 110 and the obtaining unit 112. When the user equipment may include the determining unit 110 and/or the obtaining unit 112, the receiving unit 104 may be not configured to receive the first subframe set sent by the base station, that is, in this case, the base station may not send the first subframe set.

Preferably, the receiving unit 104 is further configured to receive trigger information sent by the base station, and the sending unit 102 is further configured to send the interference report to the base station with triggering of the trigger information.

Figure 12:
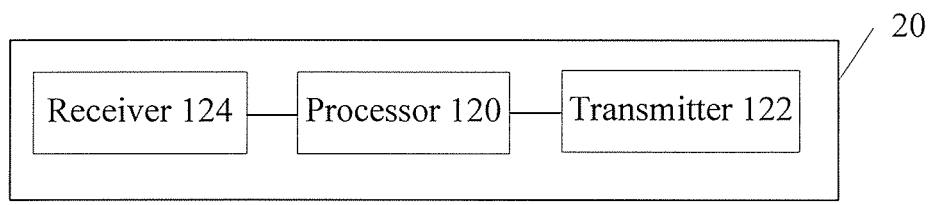
FIG. 12 is a structural diagram of a user equipment according to a seventh embodiment of the present invention.

An embodiment of the present invention further provides a user equipment, where the user equipment may be configured to implement the method embodiment related to the user equipment in the foregoing. FIG. 12 is a structural diagram of a user equipment according to a seventh embodiment of the present invention, and as shown in FIG. 12, the user equipment 20 includes: a processor 120, a transmitter 122, and a receiver 124. The structure of the user equipment is illustrated in the following.

The processor 120 is configured to generate an interference report.

The transmitter 122 is configured to send the interference report generated by the processor 120 to a base station, so that the base station determines, according to the interference report, at least two measurement sets for the user equipment.

The receiver 124 is configured to receive the at least two measurement sets notified by the base station.

The processor 120 is further configured to measure channel state information for each of the at least two measurement sets received by the receiver 124.

The transmitter 122 is configured to report, to the base station, the channel state information that is corresponding to each of the at least two measurement sets and is measured by the processor 120.

Preferably, the at least two measurement sets are determined by the base station for the user equipment according to the interference report, one measurement set (for example, a second measurement set) in the at least two measurement sets includes only a flexible subframe, and preferably, another one or more measurement set (for example, a first measurement set) includes at least all downlink subframes included in one frame.

Preferably, the at least two measurement sets include a first measurement set and a second measurement set, where the second measurement set includes at least one flexible subframe, and the first measurement set includes at least one subframe in all subframes included in one frame other than the subframe in the second measurement set.

The determined at least one flexible subframe may be a flexible subframe having uplink and downlink interference.

Preferably, the at least two measurement sets include a first measurement set and a second measurement set, and the first measurement set and the second measurement set are one of the following:

the second measurement set includes only all flexible subframes having uplink and downlink interference in subframes corresponding to the interference report, and the first measurement set includes a remaining subframe available for downlink data transmission in one frame;

each second measurement set includes only one flexible subframe having uplink and downlink interference in subframes corresponding to the interference report, and the first measurement set includes a remaining subframe available for downlink data transmission in one frame;

the second measurement set includes only all flexible subframes having an interference level different from that of a downlink subframe in subframes corresponding to the interference report, and the first measurement set includes a remaining subframe available for downlink data transmission in one frame;

the second measurement set includes only all flexible subframes having an interference level different from that of a downlink subframe in subframes corresponding to the interference report, one first measurement set includes all downlink subframes included in one frame, and another first measurement set includes all flexible subframes having an interference level the same as that of a downlink subframe in the subframes corresponding to the interference report;

each second measurement set includes only one flexible subframe having an interference level different from that of a downlink subframe in subframes corresponding to the interference report, and the first measurement set includes a remaining subframe available for downlink data transmission in one frame;

each second measurement set includes only at least one flexible subframe having an interference level different from that of a downlink subframe in subframes corresponding to the interference report, where the flexible subframe in each second measurement set is corresponding to one interference level, and the first measurement set includes a remaining subframe available for downlink data transmission in one frame;

each second measurement set includes only one flexible subframe having an interference level different from that of a downlink subframe in subframes corresponding to the interference report, one first measurement set includes all downlink subframes included in one frame, and another first measurement set includes all flexible subframes having an interference level the same as that of a downlink subframe in the subframes corresponding to the interference report; and each second measurement set includes only at least one flexible subframe having an interference level different from that of a downlink subframe in subframes corresponding to the interference report, where the flexible subframe in each second measurement set is corresponding to one interference level, one first measurement set includes all downlink subframes included in one frame, and another first measurement set includes all flexible subframes having an interference level the same as that of a downlink subframe in the subframes corresponding to the interference report.

In a preferred implementation of the embodiment of the present invention, the processor 120 may be configured to generate the interference report in the following manner: generating the interference report according to interference measurement performed on a first subframe set.

Preferably, the processor 120 is configured to generate, according to the interference measurement performed on the first subframe set, the interference report in the following manner: determining a flexible subframe; and generating the interference report, where the interference report includes information of the flexible subframe.

The processor 120 may be configured to generate, according to the interference measurement performed on the first subframe set, the interference report in one of the following manners:

determining, according to the interference measurement performed on the first subframe set, a subframe having an interference level different from that of a downlink subframe in subframes corresponding to the first subframe set, and generating the interference report, where the interference report includes indication information of the subframe having an interference level different from that of a downlink subframe;

determining, according to the interference measurement performed on the first subframe set, interference signal intensity of each subframe in the first subframe set, and generating the interference report, where the interference report includes the interference signal intensity of each subframe in the first subframe set; and determining, according to the interference measurement performed on the first subframe set, an interference level of each subframe in the first subframe set, and generating the interference report, where the interference report includes the interference level of each subframe in the first subframe set.

Preferably, the first subframe set may be one of the following: a universal set formed by all subframes available for downlink data transmission that are included in one frame or a subset of the universal set, where the universal set or the subset of the universal set includes a flexible subframe; a universal set formed by all flexible subframes included in one frame or a subset of the universal set; and a universal set formed by all flexible subframes having uplink and downlink interference that are included in one frame or a subset of the universal set.

Preferably, the receiver 124 is further configured to receive the first subframe set sent by the base station; and the processor 120 is further configured to determine the first subframe set; or, the processor 120 is further configured to obtain the predetermined first subframe set.

In another preferred implementation of the embodiment of the present invention, the receiver 124 is further configured to receive trigger information sent by the base station, and the transmitter 122 is further configured to send the interference report to the base station with triggering of the trigger information.

This embodiment further provides a system for channel measurement, which includes any base station and any user equipment as described in the foregoing.

The processor 82 and/or processor 120 in the foregoing embodiments of the present invention may be an integrated circuit chip having a signal processing capability, or may be a hardware processor such as a central processing unit (Central Processing Unit, CPU for short). In an implementation process, the steps in the foregoing methods may be implemented by using an integral logic circuit of hardware in a processor or an instruction in a software form. The instructions may be implemented and controlled through cooperation of the processor. The processor configured to execute the methods disclosed in the embodiments of the present invention may be a universal processor, a digital signal processor (Digital Signal Processor, DSP for short), an application specific integrated circuit (Application Specific Integrated Circuit, ASIC for short), a field programmable gate array (Field Programmable Gate Array, FPGA), or another programmable logic device, a discrete gate, a transistor logic device, or a discrete hardware component. The methods, steps and logic block diagrams disclosed in the embodiments of the present invention may be implemented or executed. The universal processor may be a micro processor, or the processor may be any regular processor, a decoder, or the like. The steps of the methods disclosed in the embodiment of the present invention may be directly executed and completed by using a hardware processor, or executed and completed by using a combination of hardware and software modules in the processor. The software module may be located in a storage medium mature in this field such as a random memory, a flash memory, a read only memory, a programmable read only memory, or an electrically erasable programmable read only memory, or a register.

According to the descriptions of the foregoing embodiments, a person skilled in the art may clearly understand that the present invention may be implemented through hardware, firmware, or a combination thereof. When the present invention is implemented by using software, the foregoing functions may be stored in a computer readable medium or may be transmitted as one or more instructions or codes on the computer readable medium. The computer readable medium includes a computer storage medium and a communication medium, where the communication medium includes any medium convenient for transmitting a computer program from one place to another. The following is used as an example but is not limited to: the storage medium may be any available medium that can be accessed by a computer. For example, the computer readable medium may include a random access memory (Random Access Memory, RAM for short), a read-only memory (Read-Only Memory, ROM for short), an electrically erasable programmable read-only memory (Electrically Erasable Programmable Read-Only Memory, EEPROM for short), a compact disc read-only memory (Compact Disc Read-Only Memory, CD-ROM for short), or another optical disc storage, a magnetic disc medium or another magnetic storage device, or any other medium that can be used for carrying or storing an expected program code having an instruction or data structure form and can be accessed by the computer. In addition, any connection may be suitably used as a computer readable medium. For example, if the software is transmitted from a website, a server or another remote source by using a coaxial cable, an optical fiber cable, a twisted pair, a digital subscriber line (Digital Subscriber Line, DSL) or a wireless technology such as infrared, radio, and microwave, the coaxial cable, the optical fiber cable, the twisted pair, the DSL or the wireless technology such as infrared, radio, and microwave are included in fixation of the medium thereof. As used in the present invention, a disk (Disk) and a disc (disc) include a compact disc (Compact Disc, CD for short), a laser disc, an optical disc, a digital versatile disk (Digital Versatile Disk, DVD for short), a soft disk, and a blue light disc, where generally, the disk magnetically replicates data, and the disc optically replicates data through laser. The foregoing combination may also be included in the protection scope of the computer readable medium.

In conclusion, the foregoing descriptions are merely exemplary embodiments of the technical solution of the present invention, but are not intended to limit the protection scope of the present invention. Any modification, equivalent replacement, or improvement made within the spirit and principle of the present invention shall all fall within the protection scope of the present invention.

What is claimed is:

1. A processing method for channel measurement, the method comprising:
   receiving an interference report from a user equipment;
   determining, according to the interference report, at least two measurement sets for the user equipment;
   notifying the at least two measurement sets to the user equipment; and
   wherein the determining, according to the interference report, at least two measurement sets for the user equipment comprises:
      determining, according to the interference report, at least one flexible subframe in subframes corresponding to the interference report, and
      determining the determined at least one flexible subframe as a second measurement set, and determining at least one subframe in all subframes comprised in one frame other than the subframe in the second measurement set as a first measurement set.

2. The method according to claim 1, wherein determining, according to the interference report, the at least two measurement sets for the user equipment comprises one of the following manners:
   determining, according to the interference report, all flexible subframes having uplink and downlink interference in the subframes corresponding to the interference report, determining all the flexible subframes having uplink and downlink interference in the subframes corresponding to the interference report as a second measurement set, and determining a remaining subframe available for downlink data transmission in one frame as a first measurement set;
   determining, according to the interference report, all flexible subframes having uplink and downlink interference in the subframes corresponding to the interference report, determining each flexible subframe having uplink and downlink interference as one second measurement set, and determining a remaining subframe available for downlink data transmission in one frame as a first measurement set;
   determining, according to the interference report, a flexible subframe having an interference level different from that of a downlink subframe in the subframes corresponding to the interference report, determining the flexible subframe having an interference level different from that of a downlink subframe as a second measurement set, and determining a remaining subframe available for downlink data transmission in one frame as a first measurement set;
   determining, according to the interference report, a flexible subframe having an interference level different from that of a downlink subframe and a flexible subframe having an interference level the same as that of a downlink subframe in the subframes corresponding to the interference report, determining the flexible subframe having an interference level different from that of a downlink subframe as a second measurement set, determining the flexible subframe having an interference level the same as that of a downlink subframe as one first measurement set, and determining all downlink subframes comprised in one frame as another first measurement set;

determining, according to the interference report, a flexible subframe having an interference level different from that of a downlink subframe in the subframes corresponding to the interference report, determining each flexible subframe having an interference level different from that of a downlink subframe as one second measurement set, and determining a remaining subframe available for downlink data transmission in one frame as a first measurement set;

determining, according to the interference report, a flexible subframe having an interference level different from that of a downlink subframe in the subframes corresponding to the interference report, determining, according to an interference level, the flexible subframe having an interference level different from that of a downlink subframe as at least one second measurement set, wherein each second measurement set is corresponding to one interference level, and determining a remaining subframe available for downlink data transmission in one frame as a first measurement set;

determining, according to the interference report, a flexible subframe having an interference level different from that of a downlink subframe and a flexible subframe having an interference level the same as that of a downlink subframe in the subframes corresponding to the interference report, determining each flexible subframe having an interference level different from that of a downlink subframe as one second measurement set, determining the flexible subframe having an interference level the same as that of a downlink subframe as one first measurement set, and determining all downlink subframes comprised in one frame as another first measurement set; and determining, according to the interference report, a flexible subframe having an interference level different from that of a downlink subframe and a flexible subframe having an interference level the same as that of a downlink subframe in the subframes corresponding to the interference report, determining, according to an interference level, the flexible subframe having an interference level different from that of a downlink subframe as at least one second measurement set, wherein each second measurement set is corresponding to one interference level, determining the flexible subframe having an interference level the same as that of a downlink subframe as one first measurement set, and determining all downlink subframes comprised in one frame as another first measurement set.

3. The method according to claim 1, wherein the interference report is generated by the user equipment according to interference measurement performed on a first subframe set, wherein the first subframe set is one of the following:
a universal set formed by all subframes available for downlink data transmission that are comprised in one frame or a subset of the universal set, wherein the universal set or the subset of the universal set comprises a flexible subframe;
a universal set formed by all flexible subframes comprised in one frame or a subset of the universal set; and
a universal set formed by all flexible subframes having uplink and downlink interference that are comprised in one frame or a subset of the universal set.

4. The method according to claim 1, wherein the interference report comprises at least one of the following:
indication information of a subframe having an interference level different from that of a downlink subframe, interference signal intensity of each subframe measured by the user equipment, and an interference level of each subframe measured by the user equipment.

5. The method according to claim 1, further comprising:
receiving channel state information that is corresponding to each measurement set in the at least two measurement sets and is reported by the user equipment; and
performing, according to the channel state information, modulation and coding scheme setting and/or power control on subframes in different measurement sets separately.

6. A processing method for channel measurement, the method comprising:
generating an interference report;
sending the interference report to a base station, so that the base station determines, according to the interference report, at least two measurement sets for a user equipment;
receiving the at least two measurement sets notified by the base station;
measuring channel state information for each of the at least two measurement sets, and reporting, to the base station, the channel state information corresponding to each of the at least two measurement sets; and
wherein a second measurement set in the at least two measurement sets comprises only a flexible subframe, and a first measurement set in the at least two measurement sets comprises at least one subframe in all subframes comprised in one frame other than the subframe in the second measurement set.

7. The method according to claim 6, wherein the at least two measurement sets comprise a first measurement set and a second measurement set, and the first measurement set and the second measurement set are one of the following:
the second measurement set comprises only all flexible subframes having uplink and downlink interference in subframes corresponding to the interference report, and the first measurement set comprises a remaining subframe available for downlink data transmission in one frame;
each second measurement set comprises only one flexible subframe having uplink and downlink interference in subframes corresponding to the interference report, and the first measurement set comprises a remaining subframe available for downlink data transmission in one frame;
the second measurement set comprises only all flexible subframes having an interference level different from that of a downlink subframe in subframes corresponding to the interference report, and the first measurement set comprises a remaining subframe available for downlink data transmission in one frame;
the second measurement set comprises only all flexible subframes having an interference level different from that of a downlink subframe in subframes corresponding to the interference report, one first measurement set comprises all downlink subframes comprised in one frame, and another first measurement set comprises all flexible subframes having an interference level the same as that of a downlink subframe in the subframes corresponding to the interference report;
each second measurement set comprises only one flexible subframe having an interference level different from that of a downlink subframe in subframes corresponding to the interference report, and the first measurement set comprises a remaining subframe available for downlink data transmission in one frame;

each second measurement set comprises only at least one flexible subframe having an interference level different from that of a downlink subframe in subframes corresponding to the interference report, wherein the flexible subframe in each second measurement set is corresponding to one interference level, and the first measurement set comprises a remaining subframe available for downlink data transmission in one frame;

each second measurement set comprises only one flexible subframe having an interference level different from that of a downlink subframe in subframes corresponding to the interference report, one first measurement set comprises all downlink subframes comprised in one frame, and another first measurement set comprises all flexible subframes having an interference level the same as that of a downlink subframe in the subframes corresponding to the interference report; and each second measurement set comprises only at least one flexible subframe having an interference level different from that of a downlink subframe in subframes corresponding to the interference report, wherein the flexible subframe in each second measurement set is corresponding to one interference level, one first measurement set comprises all downlink subframes comprised in one frame, and another first measurement set comprises all flexible subframes having an interference level the same as that of a downlink subframe in the subframes corresponding to the interference report.

8. The method according to claim 6, wherein generating the interference report comprises:
generating the interference report according to interference measurement performed on a first subframe set comprising:
determining a flexible subframe according to the interference measurement performed on the first subframe set; and
generating the interference report, wherein the interference report comprises information of the flexible subframe.

9. The method according to claim 6, wherein generating the interference report according to interference measurement performed on the first subframe set comprises one of the following manners:
determining, according to the interference measurement performed on the first subframe set, a subframe having an interference level different from that of a downlink subframe in subframes corresponding to the first subframe set, and generating the interference report, wherein the interference report comprises indication information of the subframe having an interference level different from that of a downlink subframe;
determining, according to the interference measurement performed on the first subframe set, interference signal intensity of each subframe in the first subframe set, and generating the interference report, wherein the interference report comprises the interference signal intensity of each subframe in the first subframe set; and
determining, according to the interference measurement performed on the first subframe set, an interference level of each subframe in the first subframe set, and generating the interference report, wherein the interference report comprises the interference level of each subframe in the first subframe set.

10. The method according to claim 6, wherein:
the first subframe set is one of the following:
a universal set formed by all subframes available for downlink data transmission that are comprised in one frame or a subset of the universal set, wherein the universal set or the subset of the universal set comprises a flexible subframe,
a universal set formed by all flexible subframes comprised in one frame or a subset of the universal set, and
a universal set formed by all flexible subframes having uplink and downlink interference that are comprised in one frame or a subset of the universal set; and
before generating the interference report, the method further comprises one of the following:
receiving the first subframe set sent by the base station,
determining the first subframe set, and
obtaining the predetermined first subframe set.

11. A base station, comprising:
a receiver, configured to receive an interference report from a user equipment;
a processor, configured to determine, according to the interference report, at least two measurement sets for the user equipment, and notify the at least two measurement sets to the user equipment; and
wherein the processor is configured to determine, according to the interference report, the at least two measurement sets for the user equipment in the following manner:
determining, according to the interference report, at least one flexible subframe in subframes corresponding to the interference report, determining the determined at least one flexible subframe as a second measurement set, and determining at least one subframe in all subframes comprised in one frame other than the subframe in the second measurement set as a first measurement set.

12. The base station according to claim 11, wherein the processor is configured to determine, according to the interference report, the at least two measurement sets for the user equipment in one of the following manners:
determining, according to the interference report, all flexible subframes having uplink and downlink interference in the subframes corresponding to the interference report, determining all the flexible subframes having uplink and downlink interference in the subframes corresponding to the interference report as a second measurement set, and determining a remaining subframe available for downlink data transmission in one frame as a first measurement set;
determining, according to the interference report, all flexible subframes having uplink and downlink interference in the subframes corresponding to the interference report, determining each flexible subframe having uplink and downlink interference as one second measurement set, and determining a remaining subframe available for downlink data transmission in one frame as a first measurement set;
determining, according to the interference report, a flexible subframe having an interference level different from that of a downlink subframe in the subframes corresponding to the interference report, determining the flexible subframe having an interference level different from that of a downlink subframe as a second measurement set, and determining a remaining subframe available for downlink data transmission in one frame as a first measurement set;
determining, according to the interference report, a flexible subframe having an interference level different from that of a downlink subframe and a flexible subframe having an interference level the same as that of a downlink subframe in the subframes corresponding to the interference report, determining the flexible subframe having an interference level different from that of a downlink subframe as one second measurement set, determining the flexible subframe having an interference level the same as that of a downlink subframe as one first measurement set, and determining all downlink subframes comprised in a frame as another first measurement set;

determining, according to the interference report, a flexible subframe having an interference level different from that of a downlink subframe in the subframes corresponding to the interference report, determining each flexible subframe having an interference level different from that of a downlink subframe as one second measurement set, and determining a remaining subframe available for downlink data transmission in one frame as a first measurement set;

determining, according to the interference report, a flexible subframe having an interference level different from that of a downlink subframe in the subframes corresponding to the interference report, determining, according to an interference level, the flexible subframe having an interference level different from that of a downlink subframe as at least one second measurement set, wherein each second measurement set is corresponding to one interference level, and determining a remaining subframe available for downlink data transmission in one frame as a first measurement set;

determining, according to the interference report, a flexible subframe having an interference level different from that of a downlink subframe and a flexible subframe having an interference level the same as that of a downlink subframe in the subframes corresponding to the interference report, determining each flexible subframe having an interference level different from that of a downlink subframe as one second measurement set, determining the flexible subframe having an interference level the same as that of a downlink subframe as one first measurement set, and determining all downlink subframes comprised in one frame as another first measurement set; and determining, according to the interference report, a flexible subframe having an interference level different from that of a downlink subframe and a flexible subframe having an interference level the same as that of a downlink subframe in the subframes corresponding to the interference report, determining, according to an interference level, the flexible subframe having an interference level different from that of a downlink subframe as at least one second measurement set, wherein each second measurement set is corresponding to one interference level, determining the flexible subframe having an interference level the same as that of a downlink subframe as one first measurement set, and determining all downlink subframes comprised in one frame as another first measurement set.

13. The base station according to claim 11, wherein the interference report is generated by the user equipment according to interference measurement performed on a first subframe set, wherein the first subframe set is one of the following:

a universal set formed by all subframes available for downlink data transmission that are comprised in one frame or a subset of the universal set, wherein the universal set or the subset of the universal set comprises a flexible subframe;

a universal set formed by all flexible subframes comprised in one frame or a subset of the universal set; and a universal set formed by all flexible subframes having uplink and downlink interference that are comprised in one frame or a subset of the universal set.

14. The base station according to claim 11, wherein the interference report comprises at least one of the following: indication information of a subframe having an interference level different from that of a downlink subframe, interference signal intensity of each subframe measured by the user equipment, and an interference level of each subframe measured by the user equipment.

15. The base station according to claim 11, wherein:

the receiver is configured to, for each measurement set in the at least two measurement sets, receive channel state information reported by the user equipment; and the processor is further configured to perform, according to the channel state information, modulation and coding scheme setting and/or power control on subframes in different measurement sets separately.

16. A user equipment, comprising:

a processor, configured to generate an interference report;

a transmitter, configured to send the interference report to a base station, so that the base station determines, according to the interference report, at least two measurement sets for the user equipment;

a receiver, configured to receive the at least two measurement sets notified by the base station;

wherein the processor is further configured to measure channel state information for each of the at least two measurement sets;

wherein the transmitter is further configured to report, to the base station, the channel state information corresponding to each of the at least two measurement sets; and wherein a second measurement set in the at least two measurement sets comprises only a flexible subframe, and a first measurement set in the at least two measurement sets comprises at least one subframe in all subframes comprised in one frame other than the subframe in the second measurement set.

17. The user equipment according to claim 16, wherein the at least two measurement sets comprise a first measurement set and a second measurement set, and the first measurement set and the second measurement set are one of the following:

the second measurement set comprises only all flexible subframes having uplink and downlink interference in subframes corresponding to the interference report, and the first measurement set comprises a remaining subframe available for downlink data transmission in one frame;

each second measurement set comprises only one flexible subframe having uplink and downlink interference in subframes corresponding to the interference report, and the first measurement set comprises a remaining subframe available for downlink data transmission in one frame;

the second measurement set comprises only all flexible subframes having an interference level different from that of a downlink subframe in subframes corresponding to the interference report, and the first measurement set comprises a remaining subframe available for downlink data transmission in one frame;

the second measurement set comprises only all flexible subframes having an interference level different from that of a downlink subframe in subframes corresponding to the interference report, one first measurement set comprises all downlink subframes comprised in one frame, and another first measurement set comprises all flexible subframes having an interference level the same as that of a downlink subframe in the subframes corresponding to the interference report;

each second measurement set comprises only one flexible subframe having an interference level different from that of a downlink subframe in subframes corresponding to the interference report, and the first measurement set comprises a remaining subframe available for downlink data transmission in one frame;

each second measurement set comprises only at least one flexible subframe having an interference level different from that of a downlink subframe in subframes corresponding to the interference report, wherein the flexible subframe in each second measurement set is corresponding to one interference level, and the first measurement set comprises a remaining subframe available for downlink data transmission in one frame;

each second measurement set comprises only one flexible subframe having an interference level different from that of a downlink subframe in subframes corresponding to the interference report, one first measurement set comprises all downlink subframes comprised in one frame, and another first measurement set comprises all flexible subframes having an interference level the same as that of a downlink subframe in the subframes corresponding to the interference report; and each second measurement set comprises only at least one flexible subframe having an interference level different from that of a downlink subframe in subframes corresponding to the interference report, wherein the flexible subframe in each second measurement set is corresponding to one interference level, one first measurement set comprises all downlink subframes comprised in one frame, and another first measurement set comprises all flexible subframes having an interference level the same as that of a downlink subframe in the subframes corresponding to the interference report.

18. The user equipment according to claim 16, wherein the processor is configured to generate the interference report in the following manner:

generate the interference report according to interference measurement performed on a first subframe set, comprising:

determining a flexible subframe according to the interference measurement performed on the first subframe set; and generating the interference report, wherein the interference report comprises information of the flexible subframe.

19. The user equipment according to claim 16, wherein the processor is configured to generate, according to the interference measurement performed on the first subframe set, the interference report in one of the following manners:

determining, according to the interference measurement performed on the first subframe set, a subframe having an interference level different from that of a downlink subframe in subframes corresponding to the first subframe set, and generating the interference report, wherein the interference report comprises indication information of the subframe having an interference level different from that of a downlink subframe;

determining, according to the interference measurement performed on the first subframe set, interference signal intensity of each subframe in the first subframe set, and generating the interference report, wherein the interference report comprises the interference signal intensity of each subframe in the first subframe set; and determining, according to the interference measurement performed on the first subframe set, an interference level of each subframe in the first subframe set, and generating the interference report, wherein the interference report comprises the interference level of each subframe in the first subframe set.

20. The user equipment according to claim 16, wherein:

the first subframe set is one of the following:

a universal set formed by all subframes available for downlink data transmission that are comprised in one frame or a subset of the universal set, wherein the universal set or the subset of the universal set comprises a flexible subframe, a universal set formed by all flexible subframes comprised in one frame or a subset of the universal set, and a universal set formed by all flexible subframes having uplink and downlink interference that are comprised in one frame or a subset of the universal set; and the receiver is further configured to receive the first subframe set sent by the base station, or the processor is further configured to determine the first subframe set, or the processor is further configured to obtain the predetermined first subframe set.

* * * * *